United States Patent
Kwon et al.

(10) Patent No.: US 11,868,547 B2
(45) Date of Patent: Jan. 9, 2024

(54) ELECTRONIC DEVICE AND METHOD OF OPERATING THE ELECTRONIC DEVICE

(71) Applicant: Samsung Electronics Co., Ltd., Gyeonggi-do (KR)

(72) Inventors: Banghyun Kwon, Gyeonggi-do (KR); Mirang Park, Gyeonggi-do (KR); Eunyoung Chang, Gyeonggi-do (KR); Inhyung Jung, Gyeonggi-do (KR); Sangheon Kim, Gyeonggi-do (KR); Yeunwook Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/892,322

(22) Filed: Aug. 22, 2022

(65) Prior Publication Data
US 2022/0413638 A1 Dec. 29, 2022

Related U.S. Application Data

(63) Continuation of application No. PCT/KR2022/002169, filed on Feb. 14, 2022.

(30) Foreign Application Priority Data

Feb. 24, 2021 (KR) .......................... 10-2021-0024616

(51) Int. Cl.
*G06F 3/0354* (2013.01)
*G06F 3/01* (2006.01)
(Continued)

(52) U.S. Cl.
CPC .......... *G06F 3/03545* (2013.01); *G06F 3/017* (2013.01); *G06F 3/038* (2013.01);
(Continued)

(58) Field of Classification Search
CPC .... G06F 3/03545; G06F 3/017; G06F 3/0346; G06F 3/038; G06F 3/04883;
(Continued)

(56) References Cited

U.S. PATENT DOCUMENTS

| 8,718,938 B2 | 5/2014 | Wolf et al. |
| 2006/0210958 A1* | 9/2006 | Rimas-Ribikauskas ..................... G09B 19/0053 434/362 |

(Continued)

FOREIGN PATENT DOCUMENTS

| JP | 2020-507174 A | 3/2020 |
| KR | 10-0597798 B1 | 6/2006 |

(Continued)

*Primary Examiner* — Grant Sitta
(74) *Attorney, Agent, or Firm* — Cha & Reiter, LLC

(57) ABSTRACT

An electronic device and method are disclosed. The electronic device includes a display, a communication module configured to perform wireless connection with a stylus pen, a processor operably coupled to the display and the communication module, and a memory storing programming instructions. The processor implements the method, including: receiving, via the communication module, a gesture input from the stylus pen while the stylus pen is spaced apart from the display, determining that a gesture identification error has occurs based on the received the gesture input, and controlling the display to display a visual guide related to the gesture identification error.

18 Claims, 16 Drawing Sheets

(51) Int. Cl.
  *G06F 3/0346* (2013.01)
  *G06F 3/038* (2013.01)
  *G06F 3/04883* (2022.01)

(52) U.S. Cl.
  CPC ........ *G06F 3/0346* (2013.01); *G06F 3/04883* (2013.01); *G06F 2203/0384* (2013.01)

(58) Field of Classification Search
  CPC .. G06F 2203/0384; G06F 3/01; G06F 3/0354; G06F 3/041; G06F 9/451; G06F 3/0488; G06F 3/0383; G06F 3/04162; G06F 9/453; G06F 2203/04108
  See application file for complete search history.

(56) References Cited

U.S. PATENT DOCUMENTS

| | | | | |
|---|---|---|---|---|
| 2011/0117535 A1* | 5/2011 | Benko | ................ | G09B 19/0053 |
| | | | | 345/173 |
| 2014/0059428 A1* | 2/2014 | Jeong | ................ | G06F 3/04883 |
| | | | | 715/708 |
| 2017/0255328 A1* | 9/2017 | Zyskind | ................ | G06F 3/0383 |

FOREIGN PATENT DOCUMENTS

| | | |
|---|---|---|
| KR | 10-0764526 B1 | 10/2007 |
| KR | 10-2011-0078645 A | 7/2011 |
| KR | 10-2018-0129478 A | 12/2018 |
| KR | 10-2019-0069877 A | 6/2019 |

* cited by examiner

ELECTRONIC DEVICE AND METHOD OF OPERATING THE ELECTRONIC DEVICE

CROSS-REFERENCE TO RELATED APPLICATION(S)

This application is a continuation application of, based on and claims priority under 35 U.S.C. § 120 to PCT International Application No. PCT/KR2022/002169, which was filed on Feb. 14, 2022, and claims priority to Korean Patent Application No. 10-2021-0024616, filed on Feb. 24, 2021, in the Korean Intellectual Property Office, the disclosures of which are incorporated by reference herein their entirety.

BACKGROUND

Technical Field

Certain embodiments of the present disclosure relate to an electronic device utilized in tandem with a stylus pen, and interoperations between the two devices.

Description of Related Art

A portable electronic device, such as a smartphone, may perform various functions. The electronic device may provide a user interface though which a user may easily access and control various functions. The user interface may be displayed through a display.

Recent electronic devices allow for user inputs using a stylus pen, enabling more precise inputs. The user may operate the electronic device by touching the stylus pen to the display, or inputting a command while the stylus pen is spaced distally from the display by a short distance (i.e., a so-called "hovering" state), or inputting commands to the electronic device via inputs the stylus pen while held away from the electronic device at even longer distance. In addition, the electronic device may identify a gesture input executed via the stylus pen, and execute a function corresponding to the identified gesture.

SUMMARY

Certain embodiments of the present disclosure provide an electronic device capable of detecting an error related to a gesture input generated via a stylus pen, and providing prompts and guidance to correct the error, and a method for the same.

An electronic device, according to certain embodiments of the disclosure, includes: a display; a communication module configured to perform wireless connection with a stylus pen; a processor operably coupled to the display and the communication module; and a memory storing programming instructions, wherein the programming instructions are executable by the processor to cause the electronic device to: receive, via the communication module, a gesture input from the stylus pen while the stylus pen is spaced apart from the display; determine that a gesture identification error has occurs based on the received gesture input; and control the display to display a visual guide related to the gesture identification error.

A method of operating an electronic device, according to an embodiment, includes: establishing a communicative connection with a stylus pen via a communication module, identifying, via at least one processor, that the stylus pen is spaced apart from a display, receiving a gesture input from the stylus pen, determining that a gesture identification error has occurred based on the received gesture input, and displaying, via the display, a visual guide related to the gesture identification error.

The disclosed electronic device and method of operating the electronic device can detect an error related to a gesture input by a stylus pen, and provide visual guidance content for correcting the error. The user can recognize an error in the gesture input through the visual guide content, and be prompted to take remedial action to resolve the error.

DETAILED DESCRIPTION

Figure 1:
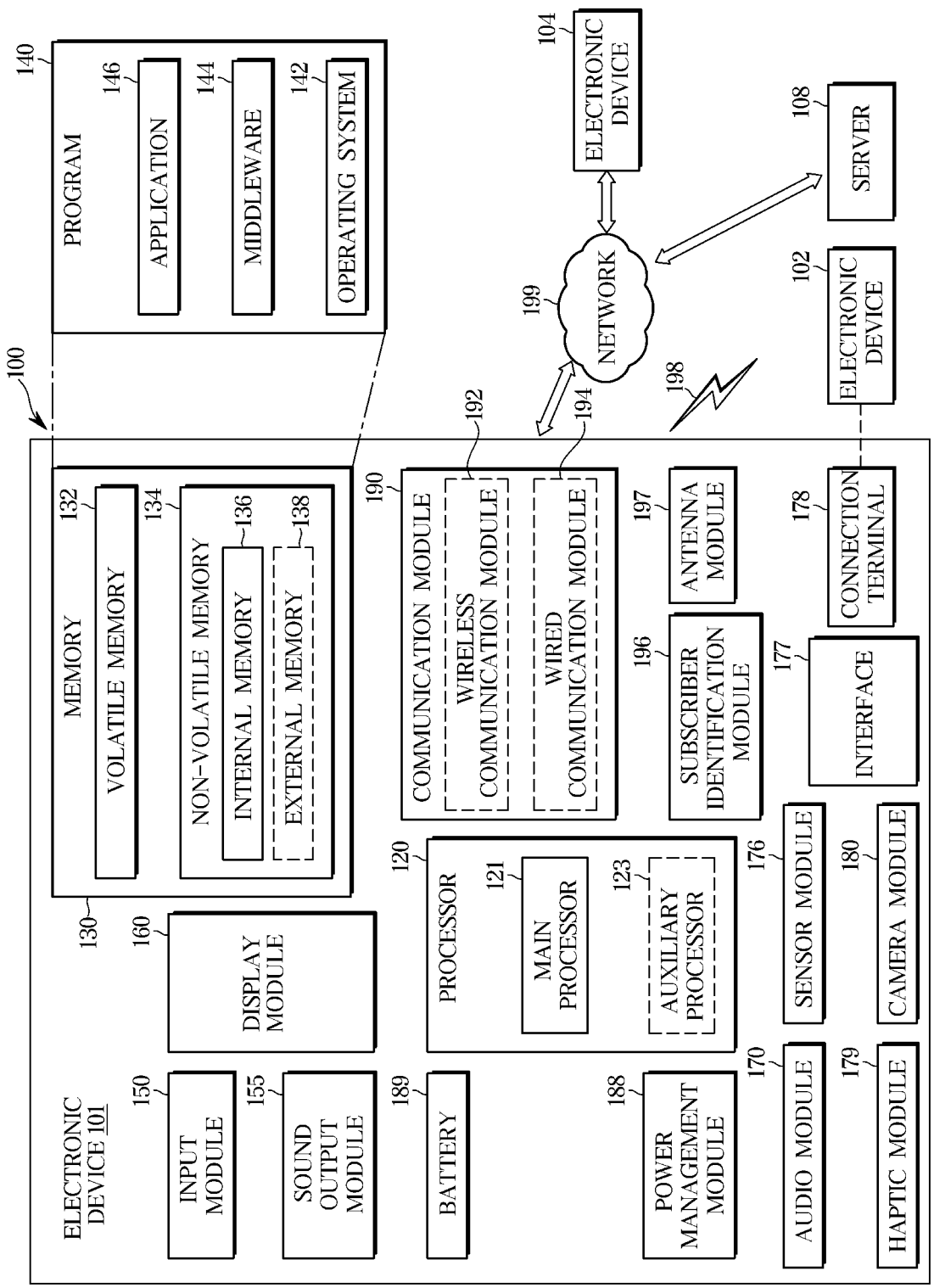
FIG. 1 is a block diagram of an electronic device in a network environment according to certain embodiments of the present disclosure.

FIG. 1 is a block diagram of an electronic device in a network environment according to certain embodiments of the present disclosure.

Referring to FIG. 1, in a network environment 100, an electronic device 101 may communicate with an electronic device 102 through a first network 198 (e.g., a short-range wireless communication network) or may communicate with least one of an electronic device 104 or a server 108 through a second network 199 (e.g., a long-distance wireless communication network). According to an embodiment, the electronic device 101 may communicate with the electronic device 104 through the server 108. According to an embodiment, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module 196, or an antenna module 197. In some embodiments, at least one of the components (e.g., the connection terminal 178) may be omitted from or one or more other components may be added to the electronic device 101. In some embodiments, some of the components (e.g., the sensor module 176, the camera module 180, or the antenna module 197) may be integrated into one component (e.g., the display module 160).

The processor 120 may execute software (e.g., a program 140) to control at least one other component (e.g., hardware or software components) of the electronic device 101 connected to the processor 120 and perform various data processing or operations. According to an embodiment, as at least part of the data processing or operation, the processor 120 may store commands or data received from other components (e.g., the sensor module 176 or the communication module 190) in a volatile memory 132, process the commands or data stored in the volatile memory 132, and store the result data in the non-volatile memory 134. According to an embodiment, the processor 120 may include a main processor 121 (e.g., a central processing unit or an application processor) or an auxiliary processor 123 (e.g., a graphic processing unit, a neural network processing unit (NPU), an image signal processor, a sensor hub processor, or a communication processor) that may operate independently or in conjunction with the main processor 121. For example, when the electronic device 101 includes the main processor 121 and the auxiliary processor 123, the auxiliary processor 123 may use less power than the main processor 121 or may be set to be specialized for a specified function. The auxiliary processor 123 may be implemented separately from or as a part of the main processor 121.

The auxiliary processor 123 may control, on behalf of the main processor 121 while the main processor 121 is in an inactive state (e.g., a sleep state) or together with the main processor 121 while the main processor 121 is in an active state (e.g., application execution), at least a part of functions and states related to at least one of the components of the electronic device 101 (e.g., the display module 160, the sensor module 176, or the communication module 190). According to an embodiment, the auxiliary processor 123 (e.g., an image signal processor or a communication processor) may be implemented as part of another component functionally related thereto (e.g., the camera module 180 or the communication module 190). According to an embodiment, the auxiliary processor 123 (e.g., a NPU) may include a hardware structure specialized for processing an artificial intelligence model. Artificial intelligence models may be generated through machine learning. Such learning may be performed by the electronic device 101 itself in which the artificial intelligence model is performed, or may be performed through a separate server (e.g., the server 108). Learning algorithms may include, for example, supervised learning, unsupervised learning, semi-supervised learning, or reinforcement learning, but the present disclosure is not limited to the above examples. The artificial intelligence model may include a plurality of artificial neural network layers. The artificial neural network may be one of: a deep neural networks (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above, but is not limited to the above example. The artificial intelligence model may additionally or alternatively include a software structure in addition to a hardware structure.

The memory 130 may store various types of data used by at least one component (e.g., the processor 120 or the sensor module 176) of the electronic device 101. The data may include, for example, software (e.g., the program 140) and input data or output data regarding commands related thereto. The memory 130 may include a volatile memory 132 or a non-volatile memory 134.

The program 140 may be stored as software in the memory 130, and may include, for example, an operating system 142, middleware 144, or an application 146.

The input module 150 may receive a command or data to be used by a component (e.g., the processor 120) of the electronic device 101 from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as multimedia playback or recording playback. The receiver may be used to receive an incoming call. According to an embodiment, the receiver may be implemented separately from or as part of the speaker.

The display module 160 may visually provide information to the outside (e.g., a user) of the electronic device 101. The display module 160 may include, for example, a display, a hologram device, or a projector and a control circuit for controlling the corresponding device. According to an embodiment, the display module 160 may include a touch sensor configured to sense a touch or a pressure sensor configured to measure the intensity of force generated by the touch.

The audio module 170 may convert a sound into an electric signal or, conversely, convert an electric signal into a sound. According to an embodiment, the audio module 170 may acquire a sound through the input module 150, or may output a sound through the sound output module 155 or an external electronic device (e.g., the electronic device 102, such as a speaker or headphones) directly or wirelessly connected to the electronic device 101.

The sensor module 176 may detect an operating state (e.g., the power or temperature) of the electronic device 101 or an external environmental state (e.g., a user state), and generate an electrical signal or data value corresponding to the detected state. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols that may be used by the electronic device 101 to directly or wirelessly connect to an external electronic device (e.g., the electronic device 102). According to an embodiment, the interface 177 may include, for example, a high definition multimedia interface (HDMI), a universal serial bus (USB) interface, an SD card interface, or an audio interface.

The connection terminal 178 may include a connector through which the electronic device 101 may be physically connected to an external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., vibration or movement) or an electrical stimulus that the user may perceive through a tactile or kinesthetic sense. According to an embodiment, the haptic module 179 may include, for example, a motor, a piezoelectric element, or an electrical stimulation device.

The camera module 180 may capture still images and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a non-rechargeable primary cell, a rechargeable secondary cell, or a fuel cell.

The communication module 190 may support establishment of a direct communication channel (e.g., a wired communication channel) or a wireless communication channel between the electronic device 101 and an external electronic device (e.g., the electronic device 102, the electronic device 104, or the server 108) and support communication performance through the established communication channel. The communication module 190 may include one or more communication processors that operate independently of the processor 120 (e.g., an application processor) and support direct (e.g., wired) communication or wireless communication. According to an embodiment, the communication module 190 may include a wireless communication module 192 (e.g., a cellular communication module, a short-range communication module, or a global navigation satellite system (GNSS) communication module) or a wired communication module 194 (e.g., a local area network (LAN) communication module or a power line communication module). A corresponding communication module among the communication modules may communicate with the external electronic device 104 through a first network 198 (e.g., a short-range communication network, such as Bluetooth™, wireless fidelity (WiFi) direct, or infrared data association (IrDA)) or a second network 199 (e.g., a long-range communication network, such as a legacy cellular network, a 5G network, a next-generation communication network, the Internet, or a computer network (e.g., a LAN or a WAN)). Such various types of communication modules may be integrated into one component (e.g., a single chip) or may be implemented as a plurality of components (e.g., a plurality of chips) separate from each other. The wireless communication module 192 may use subscriber information (e.g., International Mobile Subscriber Identifier (IMSI)) stored in the subscriber identification module 196 to identify or authenticate the electronic device 101 within a communication network, such as the first network 198 or the second network 199.

The wireless communication module 192 may support a 5G network and a next-generation communication technology that are after a 4G network, for example, supporting a new radio access technology (NR). NR access technology may support high-speed transmission of high-capacity data (enhanced mobile broadband, eMBB), reduction of terminal power usage and access to multiple terminals (massive machine type communications, mMTC), or high reliability and low latency (ultra-reliable and low-latency communications, URLLC). The wireless communication module 192 may support a high frequency band (e.g., a mmWave band) to achieve a high data rate. The wireless communication module 192 may support various technologies for securing performance in a high frequency band, for example, beam-forming, massive multiple-input and multiple-output (massive MIMO), full dimensional MIMO (FD-MIMO), array antennas, analog beam-forming, or large scale antennas. The wireless communication module 192 may support various requirements specified for the electronic device 101, an external electronic device (e.g., the electronic device 104) or the network system (e.g., the second network 199). According to an embodiment, the wireless communication module 192 may support a peak data rate (e.g., 20 Gbps or more) for realizing eMBB, loss coverage (e.g., 164 dB or less) for realizing mMTC, or U-plane latency (e.g., downlink (DL) and uplink (UL) of each 0.5 ms or less, or round trip 1 ms or less) for realizing URLLC.

The antenna module 197 may transmit or receive a signal or power to or from the outside (e.g., an external electronic device). According to an embodiment, the antenna module 197 may include an antenna including a radiator formed of a conductor or a conductive pattern formed on a substrate (e.g., a printed circuit board, PCB). According to an embodiment, the antenna module 197 may include a plurality of antennas (e.g., an array antenna). In this case, at least one antenna suitable for a communication method used in a communication network, such as the first network 198 or the second network 199, may be selected from the plurality of antennas, for example, by the communication module 190. A signal or power may be transmitted or received between the communication module 190 and an external electronic device through the selected at least one antenna. According to some embodiments, other components (e.g., a radio frequency integrated circuit, RFIC) other than the radiator may be additionally formed as a part of the antenna module 197.

According to certain embodiments, the antenna module 197 may form an mmWave antenna module. According to an embodiment, the mmWave antenna module may include a PCB, a radio-frequency integrated circuit (RFIC) disposed on or adjacent to a first surface (e.g., a lower surface) of the PCB and capable of supporting a designated high frequency band (e.g., a mmWave band), and a plurality of antennas (e.g., an array antenna) disposed on or adjacent to a second surface (e.g., an upper surface or a side surface) of the PCB and capable of transmitting or receiving signals of a designated high frequency band.

At least some of the components may be connected to each other and exchange a signal (e.g. commands or data) with each other through a communication method between peripheral devices (e.g., a bus, a general purpose input and output (GPIO), a serial peripheral interface (SPI), or a mobile industry processor interface (MIPI)).

According to an embodiment, the command or data may be transmitted or received between the electronic device 101 and the external electronic device 104 through the server 108 connected to the second network 199. Each of the external electronic devices 102 and 104 may be provided in the same type or different type as or from the electronic device 101. According to an embodiment, all or a part of operations executed in the electronic device 101 may be executed by one or more external electronic devices among the external electronic devices 102, 104, and 108. For example, when the electronic device 101 needs to perform a function or service automatically or in response to a request from a user or another device, the electronic device 101 may request one or more external electronic devices to perform at least a part of the function or service instead of or in addition to executing the function or service itself. The one or more external electronic devices having received the request may execute the at least a part of the requested function or service or an additional function or service related to the request, and transmit a result of the execution to the electronic device 101. The electronic device 101 may process the result as it is or additionally, and provide the processing result as at least a part of a response to the request. To this end, for example, cloud computing, distributed computing, mobile edge computing (MEC), or client-server computing technology may be used. The electronic device 101 may provide an ultra-low latency service using, for example, distributed computing or mobile edge computing. In another embodiment, the external electronic device 104 may include an Internet of things (IoT) device. The server 108 may be an intelligent server using machine learning and/or neural networks. According to an embodiment, the external electronic device 104 or the server 108 may be included in the second network 199. The electronic device 101 may be applied to an intelligent service (e.g., smart home, smart city, smart car, or health care) based on 5G communication technology and IoT-related technology.

The electronic device according to certain embodiments disclosed in the specification may be various types of devices. The electronic device may include, for example, a portable communication device (e.g., a smart phone), a computer device, a portable multimedia device, a portable medical device, a camera, a wearable device, or a home appliance device. The electronic device according to the embodiment of the present document is not limited to the above-described devices.

The certain embodiments of the present disclosure and terminology used herein are not intended to limit the technical features of the present disclosure to the specific embodiments, but rather should be understood to cover all modifications, equivalents, and alternatives falling within the scope of the disclosure. In the description of the drawings, like numbers refer to like elements throughout the description of the drawings. The singular forms preceded by "a," "an," and "the" corresponding to an item are intended to include the plural forms as well unless the context clearly indicates otherwise. In the present disclosure, a phrase such as "A or B," "at least one of A and B," "at least one of A or B," "A, B or C," "at least one of A, B and C," and "at least one of A, B, or C" may include any one of the items listed together in the corresponding phrase of the phrases, or any possible combination thereof. Terms, such as "first," "second," etc. are used to distinguish one element from another and do not modify the elements in other aspects (e.g., importance or sequence). When one (e.g., a first) element is referred to as being "coupled" or "connected" to another (e.g., a second) element with or without the term "functionally" or "communicatively," it refers to that the one element is connected to the other element directly (e.g., wired), wirelessly, or via a third element.

The term "module" used in certain embodiments of the specification may include a unit implemented in hardware, software, or firmware, and may be interchangeably used with terms such as, for example, a logic, a logic block, a component, or a circuit. A module may be an integrally formed component, or a minimum unit or a part of the component performing one or more functions. For example, according to an embodiment, the module may be implemented in the form of an application-specific integrated circuit (ASIC).

The certain embodiments of the disclosure may be realized by software including one or more instructions stored in a machine-readable storage media (e.g., an internal memory 1367 or external memory 138) that can be read by a machine (e.g., an electronic device 101). For example, the machine may invoke and execute at least one of the instructions stored in the storage medium, which in turn operates the machine to perform at least one function according to the invoked at least one instruction. The one or more instructions may include codes generated by a compiler or codes executable by an interpreter. The machine-readable storage medium may be provided in the form of a non-transitory storage medium. Here, when a storage medium is referred to as "non-transitory," it can be understood that the storage medium is tangible and does not include a signal, but rather that data is semi-permanently or temporarily stored in the storage medium.

According to an embodiment, the methods according to the certain embodiments disclosed herein may be provided in a computer program product. The computer program product may be traded between a seller and a buyer as a product. The computer program product may be distributed in the form of a machine-readable storage medium (e.g., compact disc read only memory (CD-ROM)), or may be distributed through an application store (e.g., Play Store™) online or between two user devices (e.g., smart phones) directly or online (e.g., download or upload). In the case of online distribution, at least a portion of the computer program product may be stored at least semi-permanently or may be temporarily generated in a storage medium, such as a memory of a server of a manufacturer, a server of an application store, or a relay server.

According to the certain embodiments, each of the above-described elements (e.g., a module or a program) may include a singular or plural entity, or some of sub-elements may be omitted, or other sub-elements may be added. Alternatively or additionally, a plurality of elements (e.g., modules or programs) may be integrated into one element. In this case, the integrated element may perform one or more functions of each of the plurality of elements in the same or similar manner as that performed by the corresponding element of the plurality of components before the integration. According to certain embodiments, operations performed by a module, program, or other elements may be executed sequentially, in parallel, repeatedly, or heuristically, or one or more of the operations may be executed in a different order, or omitted, or one or more other operations may be added.

Figure 2:
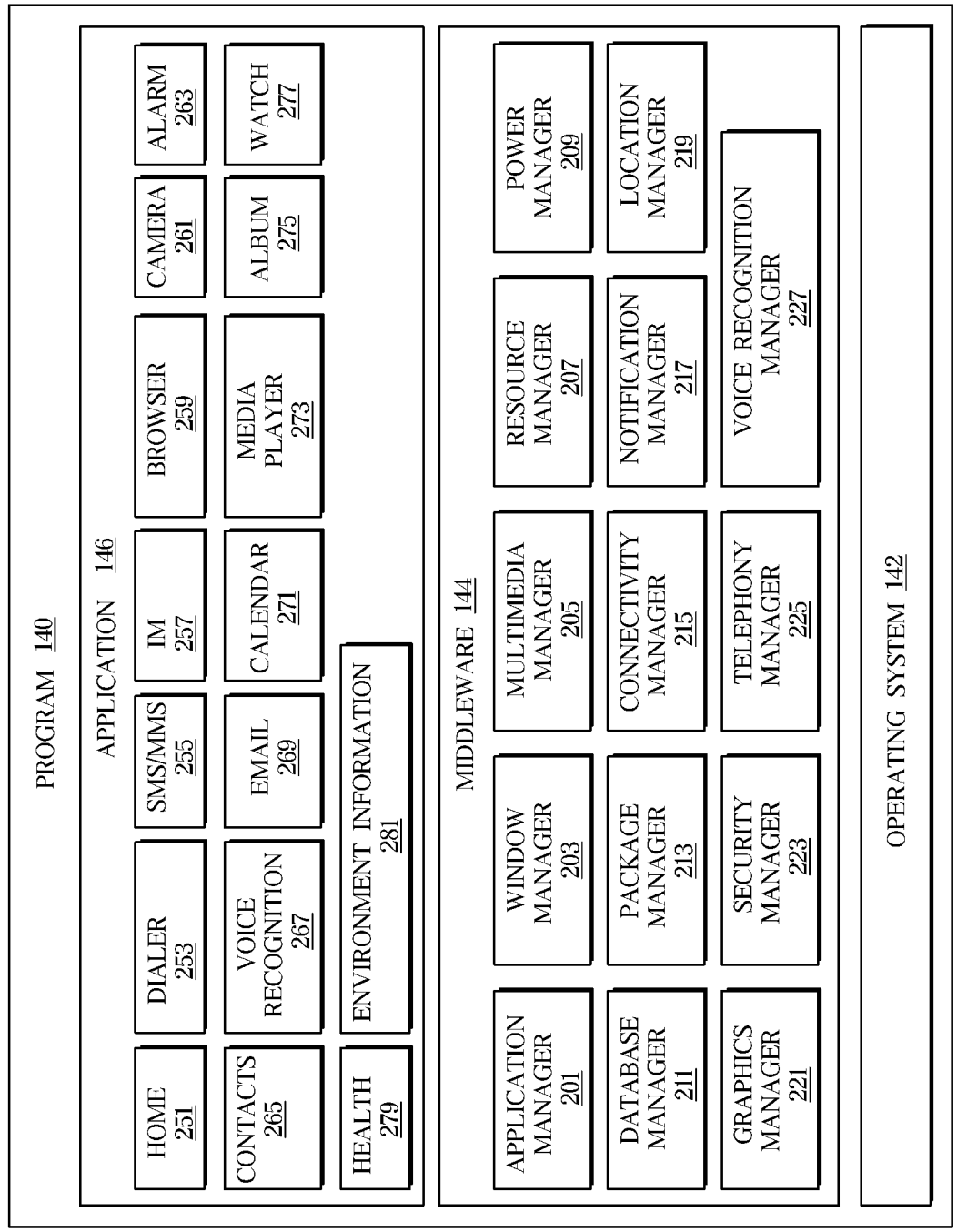
FIG. 2 is a block diagram illustrating a program according to certain embodiments.

FIG. 2 is a block diagram illustrating a program according to certain embodiments.

According to an embodiment, the program 140 may include an operating system 142 for controlling one or more resources of the electronic device 101, middleware 144, or an application 146 executable in the operating system 142. The operating system 142 may include, for example, Android™, iOSυ, Windows™, Symbian™, Tizen™, or Bada™. At least some of the programs 140 may be preloaded into the electronic device 101 at a time of manufacture, or may be downloaded from an external electronic device (e.g., the electronic device 102 or 104) or the server 108 or updated when used by a user.

The operating system 142 may control management (e.g., allocation or retrieval) of one or more system resources (e.g., a process, a memory, or power) of the electronic device 101.

The operating system 142 may additionally or alternatively include one or more driver programs for driving other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide the application 146 with various functions such that functions or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphics manager 221, a security manager 223, a telephony manager 225, or a voice recognition manager 227.

The application manager 201 may manage the life cycle of the application 146. The window manager 203 may manage one or more GUI resources used in a screen. The multimedia manager 205 may identify one or more formats utilized for playback of media files, and encode or decode a corresponding media file among the media files using a codec suitable for the selected format. The resource manager 207 may manage a source code of the application 146 or a memory space of the memory 130. The power manager 209 may, for example, manage the capacity, temperature, or power of the battery 189, and use the corresponding information to determine or provide related information utilized for the operation of the electronic device 101. According to an embodiment, the power manager 209 may interwork with a basic input/output system (BIOS) (not shown) of the electronic device 101.

The database manager 211 may generate, retrieve, or change a database to be used by the application 146, for example. The package manager 213 may manage installation or update of an application distributed in the form of a package file, for example. The connectivity manager 215 may manage, for example, a wireless connection or a direct connection between the electronic device 101 and the external electronic device. The notification manager 217 may provide, for example, a function for notifying the user of the occurrence of a specified event (e.g., an incoming call, a message, or an alarm). The location manager 219 may manage location information of the electronic device 101. The graphic manager 221 may manage, for example, one or more graphic effects to be provided to a user or a user interface related thereto.

The security manager 223 may provide, for example, system security or user authentication. The telephony manager 225 may manage, for example, a voice call function or a video call function provided by the electronic device 101. The voice recognition manager 227 may transmit the user's voice data to the server 108, and receive, from the server 108, a command corresponding to a function to be performed in the electronic device 101 based at least in part on the voice data or text data converted based at least in part on the voice data. According to an embodiment, the middleware 244 may dynamically delete some existing components or add new components. According to an embodiment, at least a part of the middleware 144 may be included as a part of the operating system 142 or implemented as software separate from the operating system 142.

The application 146 may include a home application 251, a dialer application 253, an SMS/MMS application 255, an instant message (IM) application 257, a browser application 259, a camera application 261, an alarm application 263, a contact application 265, a voice recognition application 267, an email application 269, a calendar application 271, a media player application 273, an album application 275, a watch application 277, a health application 279 (such as measuring biometric information, such as exercise or blood sugar), or an environment information application 281 (such as measuring atmospheric pressure, humidity, or temperature information). According to an embodiment, the application 146 may further include an information exchange application (not shown) capable of supporting information exchange between the electronic device 101 and an external electronic device. The information exchange application may include, for example, a notification relay application configured to transmit specified information (e.g., a call, a message, or an alarm) to an external electronic device, or a device management application configured to manage an external electronic device. The notification relay application may transmit notification information corresponding to a specified event (e.g., a mail reception) generated in another application (e.g., the email application 269) of the electronic device 101 to the external electronic device. Additionally or alternatively, the notification relay application may receive notification information from an external electronic device and provide the received notification information to the user of the electronic device 101.

The device management application may control power (e.g., turn-on or turn-off) or a function (e.g., brightness, resolution, or focus) of an external electronic device that communicates with the electronic device 101 or some component thereof (e.g., a display module or a camera module of the external electronic device). The device management application may additionally or alternatively support installation, deletion, or update of an application operating in an external electronic device.

Figure 3:
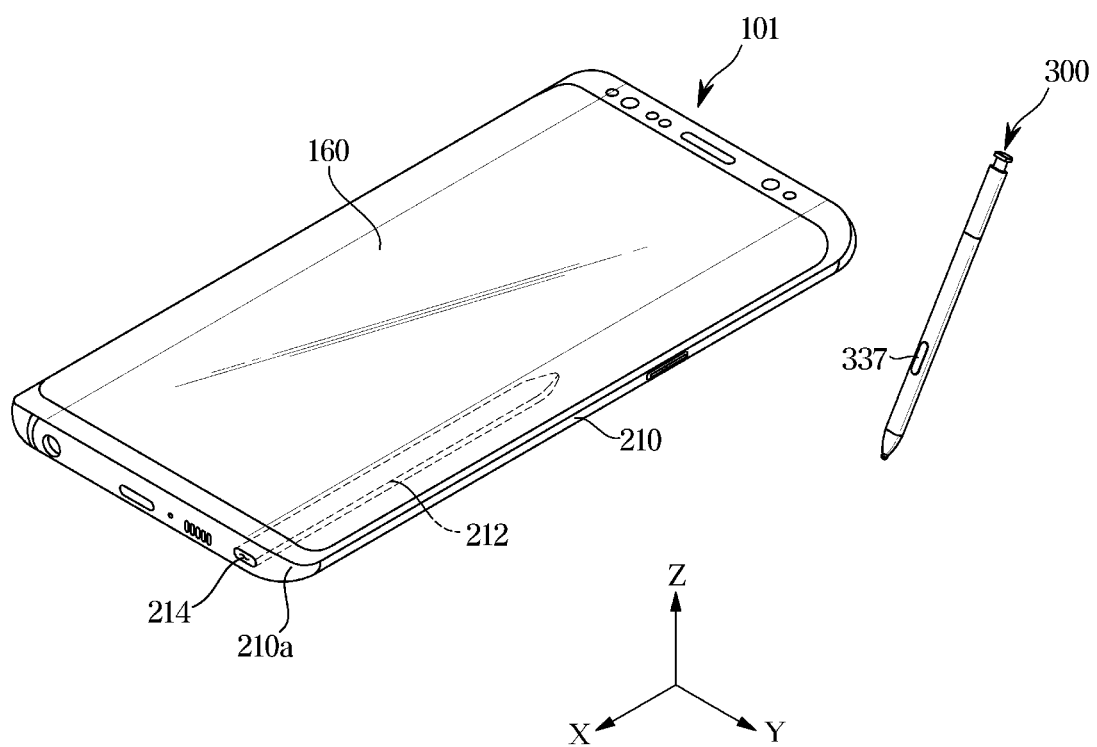
FIG. 3 illustrates an electronic device and a stylus pen according to an embodiment.

FIG. 3 illustrates an electronic device and a stylus pen according to an embodiment.

Referring to FIG. 3, the electronic device 101 according to an embodiment may be implemented as a mobile device, such as a smartphone, and may include the configuration shown in FIG. 1. In addition, the electronic device 101 may be connected to the stylus pen 300 and may perform various functions by interacting with the stylus pen 300. For example, the electronic device 101 may receive a gesture input from the stylus pen 300 and may perform a function corresponding to the gesture input. The electronic device 101 is not limited to a smartphone, and may be implemented as various types of devices that may interact with the stylus pen 300. For example, the electronic device 101 may be a device, such as a foldable smartphone, a rollable smartphone, a tablet PC, a portable multimedia device, a portable medical device, or a camera.

The electronic device 101 may include a structure into which the stylus pen 300 may be inserted. The electronic device 101 may include a housing 210 and a hole 214 provided in a portion of a side surface 210a of the housing 210. The electronic device 101 may include an accommodation space 212 connected to the hole 214, and the stylus pen 300 may be inserted into the accommodation space 212. Alternatively, the electronic device 101 may include a structure to which the stylus pen 300 may be attached. A magnet may be provided on the side or rear surface of the housing 210, and the stylus pen 300 may be attached to the housing 210 by magnetic force. In addition to the above, various structures for accommodating the stylus pen 300 may be applied to the electronic device 101.

The user may input various commands to the electronic device 101 using the stylus pen 300 and execute various functions of the electronic device 101. For example, a touch input made while the stylus pen 300 is in contact with the display 160 of the electronic device 101, a hovering input made in a hovering state in which the stylus pen 300 is spaced apart from the display 160 to be located within a predetermined distance from the display 160, or a gesture input made in an air state in which the stylus pen 300 is located distant from the display 160 may be performable. The gesture input in the air state may be referred to as an air action input. The user input using the stylus pen 300 is illustrative purpose only, without being limited thereto, and may include various types of inputs.

As described above, the electronic device 101 may include the display (or the display module) 160, the communication module 190, the processor 120, and/or the memory 130. The processor 120 may be operatively and/or electrically connected to the display 160, the communication module 190, or the memory 130. The memory 130 may store various instructions that may be executed by the processor 120. The instructions stored in the memory 130 may include arithmetic operations, logical operations, data movement, or control instructions, such as input/output, that may be processed by the processor 120.

The processor 120 of the electronic device 101 may acquire position data of the stylus pen 300. The processor 120 of the electronic device 101 may calculate a separation distance between the stylus pen 300 and the display 160 based on the position data of the stylus pen 300, and based on the separation distance between the stylus pen 300 and the display 160, identify an arrangement state of the stylus pen 300. For example, the processor 120 of the electronic device 101 may determine a hovering state in which the stylus pen 300 is spaced apart from the display 160 to be located within a predetermined distance from the display 160, or an air state in which the stylus pen 300 is spaced apart from the display 160 to be located outside the predetermined distance from the display 160.

In addition, when the stylus pen 300 is in a hovering state or in an air state, the processor 120 of the electronic device 101 may receive a gesture input of the stylus pen 300 through the communication module 190. The processor 120 of the electronic device 101 may detect a gesture identification error in response to the gesture input of the stylus pen 300 and may control the display 160 to display guide content related to the gesture identification error. The gesture identification error and the display of guide content corresponding thereto will be described in detail from FIG. 6.

According to an embodiment, the display 160 may include at least one of a liquid crystal display (LCD), a thin film transistor LCD (TFT-LCD), an organic light emitting diode (OLED), a light emitting diode (LED), an active matrix organic LED (AMOLED), a micro LED, a mini LED, a flexible display, or a three-dimensional display. In addition, some of the displays may be configured as a transparent type display or a light transmitting type display through which the outside may be viewable. Such a display may be configured in the form of a transparent display including a transparent OLED (TOLED).

Although the electronic device 101 illustrated in FIG. 3 has a bar-type or plate-type appearance, certain embodiments of the present disclosure are not limited thereto. For example, the illustrated electronic device 101 may be a part of a rollable electronic device or a foldable electronic device.

Figure 4:
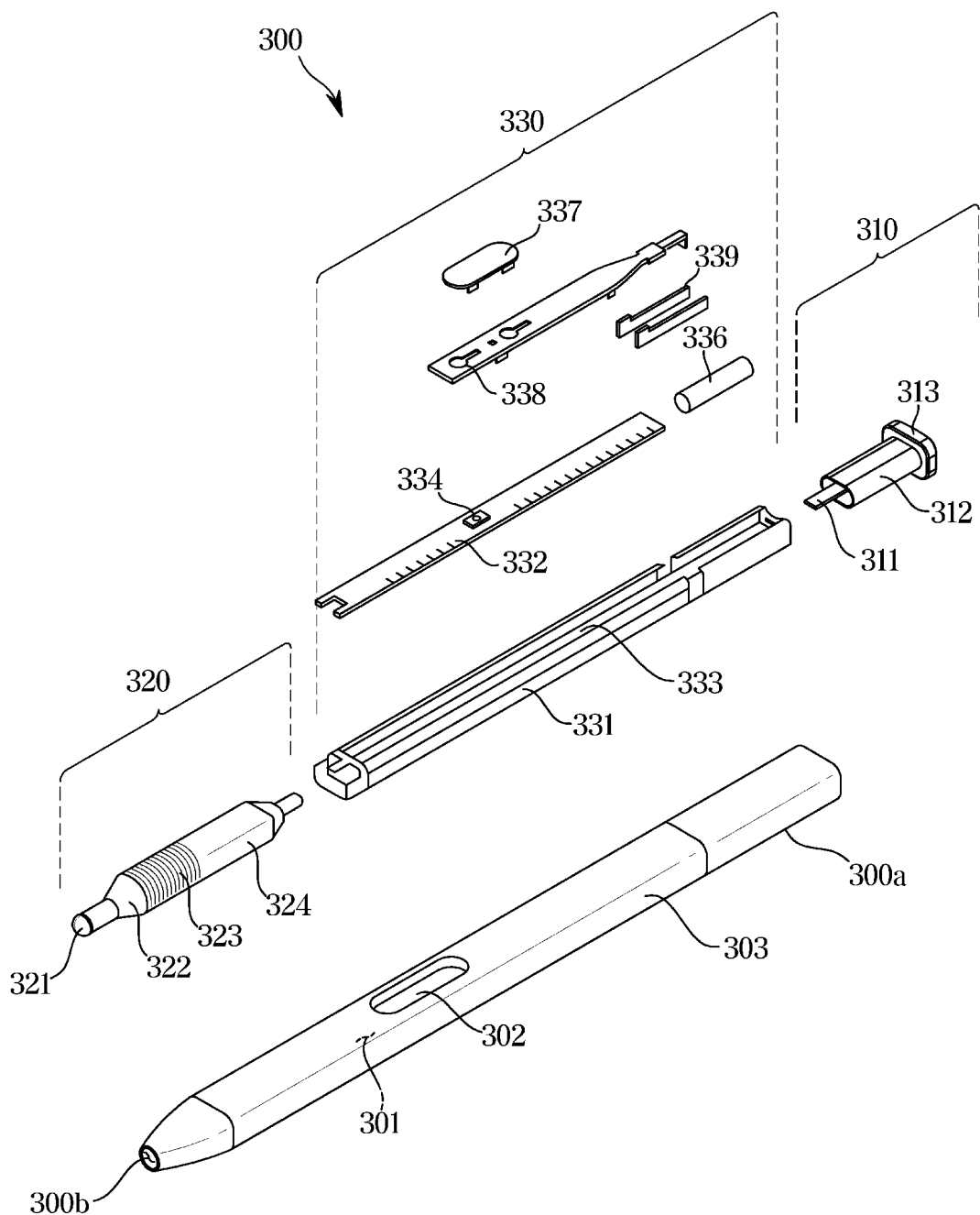
FIG. 4 illustrates a detailed structure of a stylus pen according to an embodiment.

FIG. 4 illustrates a detailed structure of a stylus pen according to an embodiment.

Referring to FIG. 4, the stylus pen 300 according to an embodiment may include a pen housing 303 forming an outer appearance of the stylus pen 300 and an inner assembly inside the pen housing 303. In FIG. 4, the inner assembly may include all of various components mounted inside the pen and may be inserted into the pen housing 303 in a single assembly operation.

The pen housing 303 may have an elongated shape between a first end 300a and a second end 300b, and may include an accommodation space 301 therein. The pen housing 303 may have an elliptical cross-section including a major axis and a minor axis, and may be formed in an elliptical column shape as a whole. The accommodation space 212 of the electronic device 101 may also have an elliptical cross-section to correspond to the shape of the pen housing 303. The pen housing 303 may include a synthetic resin (e.g., plastic) and/or a metallic material (e.g., aluminum). According to an embodiment, the second end 300b of the pen housing 303 may be formed of a synthetic resin material.

The inner assembly may have an elongated shape to correspond to the shape of the pen housing 303. The inner assembly may be largely divided into three parts along the longitudinal direction. For example, the inner assembly may include an ejection member 310 disposed at a position corresponding to the first end 300a of the pen housing 303, a coil part 320 disposed at a position corresponding to the second end 300b of the pen housing 303, and a circuit board part 330 disposed at a position corresponding to the body of the housing.

The ejection member 310 may include a component for withdrawing the stylus pen 300 from the accommodation space 212 of the electronic device 101. According to an embodiment, the ejection member 310 may include a shaft 311, an ejection body 312 disposed around the shaft 311 and forming the overall appearance of the ejection member 310, and a button part 313. When the inner assembly is fully inserted into the pen housing 303, a portion including the shaft 311 and the ejection body 312 may be surrounded by the first end 300a of the pen housing 303, and the button part 313 may be exposed to the outside of the first end 300a. A plurality of components not shown, for example, cam members or elastic members, may be disposed within the ejection body 312 to form a push-pull structure. In an embodiment, the button part 313 may be substantially coupled to the shaft 311 to make a linear reciprocating motion with respect to the ejection body 312. According to certain embodiments, the button part 313 may include a button having a locking structure such that a user may take out the stylus pen 300 using a fingernail. According to an embodiment, the stylus pen 300 may provide another input method by including a sensor for detecting a linear reciprocating motion of the shaft 311.

The coil part 320 may include a pen tip 321 exposed to the outside of the second end 300b when the inner assembly is fully inserted into the pen housing 303, a packing ring 322, a coil 323 wound a plurality of times, and/or a pen pressure sensing part 324 for acquiring a change in pressure according to the pressing of the pen tip 321. The packing ring 322 may include epoxy, rubber, urethane, or silicone. The packing ring 322 may be provided for the user of waterproofing and dustproofing, and may protect the coil part 320 and the circuit board part 330 from water immersion or dust. According to an embodiment, the coil 323 may form a resonant frequency in a set frequency band (e.g., 500 kHz), and may be combined with at least one element (e.g., a capacitive element) to adjust a resonance frequency formed by the coil 323 in a certain extent of range.

The circuit board part 330 may include a printed circuit board 332, a base 331 surrounding at least one surface of the printed circuit board 332, and an antenna. According to an embodiment, the base 331 may include a substrate seating part 333 formed on an upper surface thereof and on which the printed circuit board 332 is disposed, and the printed circuit board 332 seated on the substrate seating part 333 may be fixed. The printed circuit board 332 may include an upper surface and a lower surface, and a variable capacitance capacitor or switch 334 connected to the coil 323 may be disposed on the upper surface, and a charging circuit, a battery, or a communication circuit may be disposed on the lower surface. The battery may include an electric double layered capacitor (EDLC). The charging circuit may be positioned between the coil 323 and the battery and may include a voltage detector circuitry and a rectifier.

The antenna may include an antenna structure 339 as shown in FIG. 4 and/or an antenna embedded in the printed circuit board 332. According to certain embodiments, the switch 334 may be provided on the printed circuit board 332. A side button 337 provided on the stylus pen 300 may be used to press the switch 334 and may be exposed to the outside through a side opening 302 of the pen housing 303. The side button 337 is supported by a support member 338, and unless an external force is applied to the side button 337, the side button 337 may be restored or maintained at a predetermined position with an elastic restoring force provided by the support member 338.

The circuit board part 330 may include other packing rings, such as O-rings. For example, O-rings formed of an elastic material may be disposed at both ends of the base 331 to form a sealing structure between the base 331 and the pen housing 303. In some embodiments, the support member 338 may partially come in close contact with an inner wall of the pen housing 303 around the side opening 302 to form a sealing structure. For example, the circuit board part 330 may also have a waterproof and dustproof structure similar to the packing ring 322 of the coil part 320.

The stylus pen 300 may include a battery seating part 335 formed on an upper surface of the base 331 to seat a battery 336 thereon. The battery 336 mounted on the battery seating part 335 may include, for example, a cylinder type battery.

The stylus pen 300 may include a microphone (not shown). The microphone may be directly connected to the printed circuit board 332 or connected to a separate flexible printed circuit board (FPCB) (not shown) connected to the printed circuit board 332. According to certain embodiments, the microphone may be disposed in a position parallel to the side button 337 in the longitudinal direction of the stylus pen 300.

Figure 5:
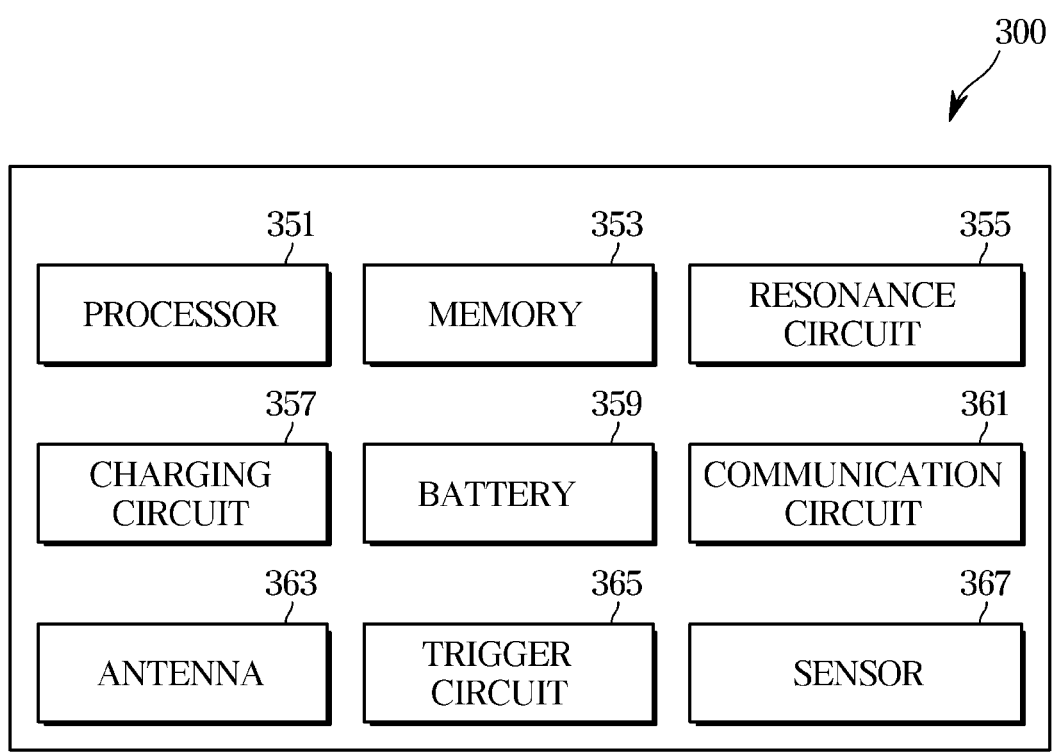
FIG. 5 is a block diagram of a stylus pen according to an embodiment.

FIG. 5 is a block diagram of a stylus pen according to an embodiment.

Referring to FIG. 5, the stylus pen 300 includes a processor 351, a memory 353, a resonance circuit 355, a charging circuit 357, a battery 359, a communication circuit 361, an antenna 363, a trigger circuit 365, and/or a sensor 367. The stylus pen 300 may implement certain embodiments of the present disclosure even when at least some of the illustrated components are omitted or substituted. The processor 351, at least a part of the resonance circuit 355, and/or at least a part of the communication circuit 361 may be configured on a printed circuit board or in the form of a chip. The processor 351, the resonant circuit 355, and/or the communication circuit 361 may be electrically connected to the memory 353, the charging circuit 357, the battery 359, the antenna 363, or the trigger circuit 365. The stylus pen 300 according to an embodiment may include the resonance circuit 355 and a button.

The processor 351 may control each component of the stylus pen 300. For example, the processor 351 may control the communication circuit 361 such that a user input using a button and/or a gesture input of the stylus pen 300 detected by the sensor 367 is transmitted to the communication module 190 of the electronic device 101.

The processor 351 may include a generic processor configured to execute a customized hardware module or software module (e.g., an application program). The processor 351 may include a hardware component (functions) or software component (programs) including at least one of various sensors, a data measurement module, an input/output interface, a module for managing the state or environment of the stylus pen 300, or a communication module provided in the stylus pen 300. The processor 351 may include one or a combination of two or more of hardware, software, or firmware. According to an embodiment, the processor 351 may receive a proximity signal corresponding to an electromagnetic field signal generated from a digitizer of the electronic device 101 through the resonance circuit 355. When the proximity signal is identified, the processor 351 may control the resonance circuit 355 to transmit an electromagnetic resonance (EMR) input signal to the electronic device 101.

The memory 353 may store information related to the operation of the stylus pen 300. For example, the memory 353 may store information for communication with the electronic device 101 and frequency information related to an input operation of the stylus pen 300.

The resonance circuit 355 may include at least one of a coil, an inductor, or a capacitor. The resonance circuit 355 may be used by the stylus pen 300 to generate a signal including a resonance frequency. For example, the stylus pen 300 may generate a signal using at least one of an electro-magnetic resonance (EMR) method, an active electrostatic (AES) method, or an electrically coupled resonance (ECR) method. When the stylus pen 300 transmits a signal by the EMR method, the stylus pen 3500 may generate a signal including a resonant frequency, based on an electromagnetic field generated from an inductive panel of the electronic device 101. When the stylus pen 300 transmits a signal by the AES method, the stylus pen 300 may generate a signal using capacitive coupling with the electronic device 101. When the stylus pen 300 transmits a signal by the ECR method, the stylus pen 300 may generate a signal including a resonant frequency, based on an electric field generated from a capacitive device of the electronic device 101. According to an embodiment, the resonance circuit 355 may be used to change the strength or frequency of the electromagnetic field according to a user's manipulation state. For example, the resonant circuit 355 may provide a frequency for recognizing a hovering input, a drawing input, a button input, a gesture input, or an erasing input.

The charging circuit 350, when connected to the resonance circuit 355 based on the switching circuit, may rectify a resonance signal generated in the resonance circuit 355 into a DC signal and provide the rectified resonance signal to the battery 359. According to an embodiment, the stylus pen 300 may identify whether the stylus pen 300 is inserted into the electronic device 101 using the voltage level of the DC signal detected by the charging circuit 357.

The battery 359 may be configured to store power utilized for the operation of the stylus pen 300. The battery 359 may include, for example, a lithium-ion battery or capacitor, and may be rechargeable or replaceable. According to an embodiment, the battery 359 may be charged using power (e.g., a DC signal (direct current power)) provided from the charging circuit 357.

The communication circuit 361 may be a component for communicating with the communication module 190 of the electronic device 101 and may support a short-range wireless communication method (e.g., Bluetooth™, Bluetooth™ low energy (BLE), wireless LAN). The communication circuit 361 may transmit a wireless signal corresponding to a user input using a button and/or a sensor 367 to the electronic device 101.

The communication circuit 361 may transmit state information and input information of the stylus pen 300 to the electronic device 101 using a short-distance communication method. For example, the communication circuit 361 may transmit direction information (e.g., motion sensor data) of the stylus pen 300 acquired through the trigger circuit 365, voice information input through a microphone, and/or remaining amount information of the battery 359 to the electronic device 101.

The antenna 363 may be used to transmit or receive a signal or power to or from the outside (e.g., the electronic device 101). According to an embodiment, the stylus pen 300 may include a plurality of antennas 363, and among the plurality of antennas 363, select at least one antenna 363 suitable for a communication method. The communication circuit 361 may exchange a signal or power with the external electronic device 101 through the selected at least one antenna 363.

The trigger circuit 365 may transmit a trigger signal to the electronic device 101 based on an input signal of the button or a detection signal of the sensor 367. For example, the processor 351 may check an input method (e.g., a touch or press) on the button of the stylus pen 300 or a button type (e.g., an EMR button or a BLE button), and transmit a trigger signal according to the button input to the electronic device 101.

The stylus pen 300 may include at least one sensor 367. The sensor 367 may include a gyro sensor and an acceleration sensor, and may detect movement and motion of the stylus pen 300. In addition, the sensor 367 may include at least one of a battery sensor, a pressure sensor, an optical sensor, a temperature sensor, a geomagnetic sensor, or a biometric sensor. The sensor 367 may generate an electrical signal or data corresponding to an operating state of the stylus pen 300 or an external environmental state. In addition, the stylus pen 300 may include a microphone and a camera.

Figure 6:
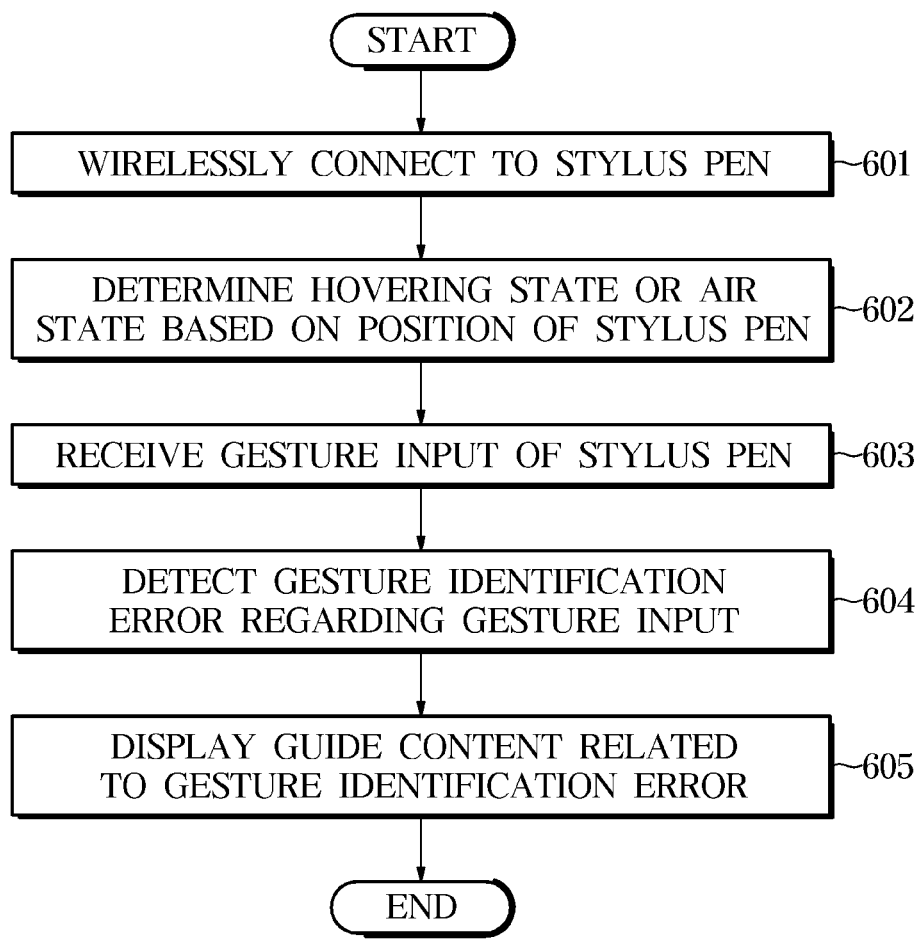
FIG. 6 is a flowchart for describing a method of operating an electronic device according to an embodiment.

FIG. 6 is a flowchart for describing a method of operating an electronic device according to an embodiment. The operations illustrated in FIG. 6 may be implemented via instructions (commands) that are performable by the processor 120 of the electronic device 101 of FIG. 1.

Referring to FIG. 6, the electronic device 101 may be wirelessly connected to the stylus pen 300 (operation 601). That is, the processor 120 of the electronic device 101 may control the communication module 190 to establish and maintain a wireless connection with the stylus pen 300. For example, the electronic device 101 may be connected to the stylus pen 300 using Bluetooth™.

The processor 120 of the electronic device 101 may determine a separation state in which the stylus pen 300 is separated from the display 160. The "separation state" may include a hovering state in which the stylus pen 300 is spaced apart from the display 160 so as to be located within a predetermined distance from the display 160, or an "air state" in which the stylus pen 300 is spaced apart from the display 160 while also disposed beyond the predetermined distance from the display 160. The processor 120 of the electronic device 101 may acquire position data of the stylus pen 300, and determine whether the stylus pen 300 is disposed in a hovering state or an air state based on the position of the stylus pen 300 (operation 602).

The processor 120 of the electronic device 101 may receive a gesture input of the stylus pen 300, while the stylus pen 300 is disposed in the hovering state or the air state (operation 603). The gesture input may be generated when a user grips the stylus pen 300 in their hand and moves the stylus to form a gesture while depressing the side button 337. A sensor 367, such as a gyro sensor and an acceleration sensor that is disposed in the stylus pen 300, may detect a gesture input by the movement of the stylus pen 300, and the stylus pen 300 may transmit the detected gesture input to the electronic device 101 using the communication circuit 361.

The processor 120 of the electronic device 101 may detect a gesture identification error regarding the gesture input received from the stylus pen 300 (operation 604). In order to perform a function of the electronic device 101 through the gesture input of the stylus pen 300, the gesture input is first normally identified. However, when identification of the gesture input encounters some error or otherwise fails, a gesture identification error may occur. For example, the electronic device 101 may store a number of predetermined reference gestures corresponding to each function of the electronic device 101, but when a gesture input of the stylus pen 300 does not match any of the stored predetermined reference gestures, the electronic device 101 may determine that a gesture identification error has occurred.

The processor 120 of the electronic device 101 may control the display 160 to display guide content related to a gesture identification error (operation 605). The processor 120 of the electronic device 101 may store a plurality of potential guide content (e.g., visual guidance prompts, illustrations and other instructions prompting user to execute some action), and map the stored guide content to corresponding types of gesture identification errors. The guide content may include floating icons and/or a pop-up messages, but may be provided in various forms without being limited thereto. The guide content may include text, a static image, and/or a dynamic image. The guide content including text may be displayed for a first predetermined time (e.g., three seconds). The guide content including an image may be displayed for a second predetermined time (e.g., five seconds). In addition, when an interaction of the stylus pen 300 occurs while the guide content is displayed, the processor 120 of the electronic device 101 may immediately terminate display of the guide content. Through the viewing of guide content, the user may recognize that a gesture input error has occurred, and may receive instruction as to how to take remedial action to resolve the error.

The processor 120 of the electronic device 101 may count the number of occurrences of the gesture identification error. The processor 120 may control the display 160 to display the guide content when the gesture identification error is detected consecutively for a first predetermined number of times (e.g., two times). In addition, the processor 120 may control the display 160 to display the guide content when the gesture identification error is cumulatively detected for a predetermined second number of times (e.g., five times). The processor 120 may initialize (e.g., reset to zero) the counted number of occurrences of the gesture identification error after the guide content on the display 160 is output.

Figure 7:
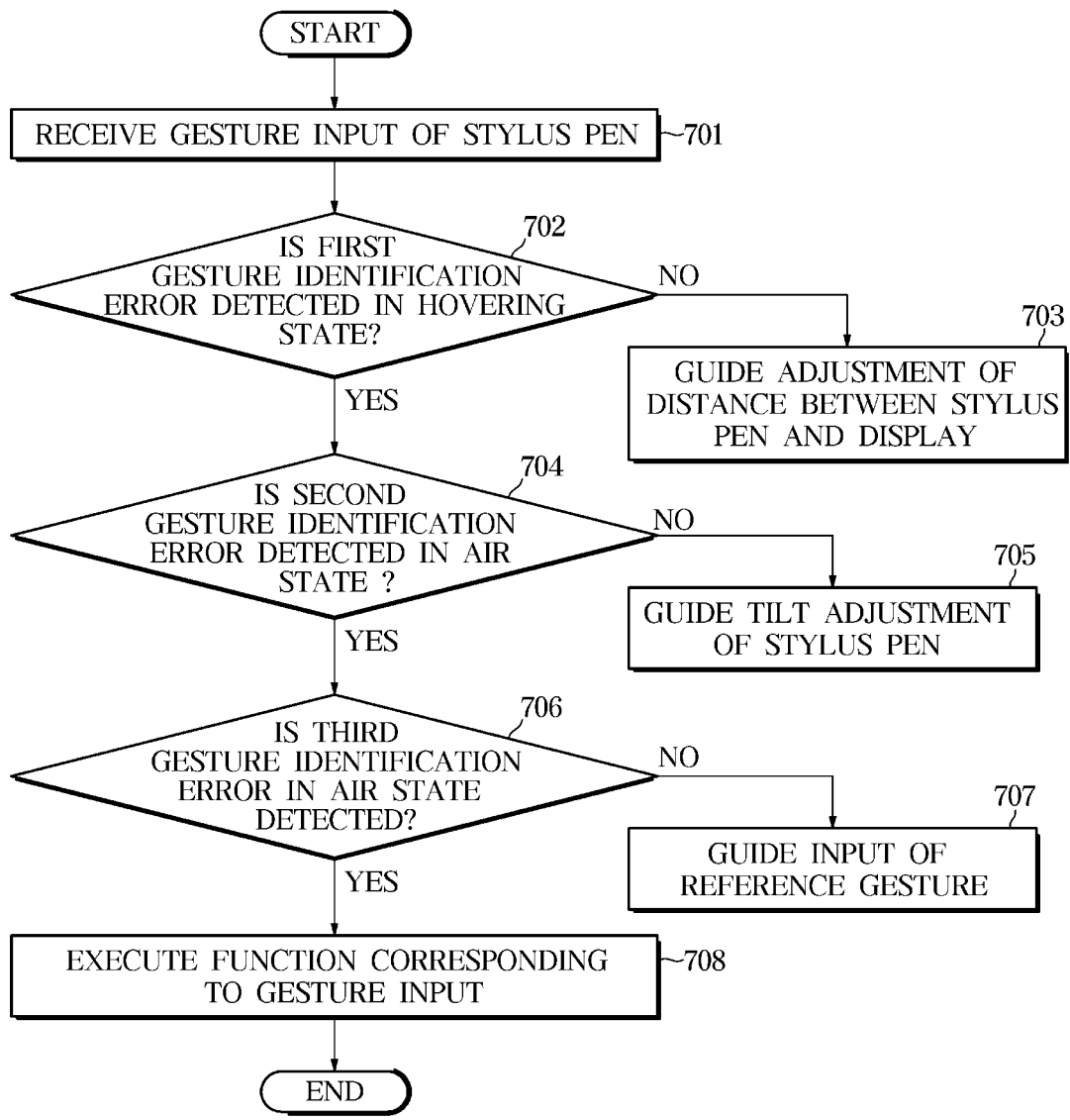
FIG. 7 is a flowchart for describing the method shown in FIG. 6 in more detail.

FIG. 7 is a flowchart for describing the method shown in FIG. 6 in more detail. Referring to FIG. 7, the processor 120 of the electronic device 101 may receive a gesture input of the stylus pen 300 (operation 701). In addition, the processor 120 of the electronic device 101 may detect a gesture identification error has occurred for the received gesture input. For example, the processor 120 of the electronic device 101 may detect a first gesture identification error generated by a gesture input in a hovering state, a second gesture identification error generated by a tilt of the stylus pen 300 in an air state, or a third gesture identification error generated by an identification of an abnormal gesture in the air state. The processor 120 of the electronic device 101 may control the display 160 to display guide content corresponding to each of the first gesture identification error, the second gesture identification error, or the third gesture identification error, depending on which error has actually occurred.

The processor 120 of the electronic device 101 may detect an error in a gesture input received in a hovering state, indicating that a first gesture identification error has occurred (operation 702). The electronic device 101 may execute a function upon detecting a button input generated using a side button 337 of the stylus pen 300 while disposed in a hovering state. However, in the hovering state, there may be no executable function associated with the gesture input. Accordingly, the processor 120 of the electronic device 101 may determine that the gesture input received in the hovering state is not processible. Accordingly, the gesture input generated in the hovering state may be immediately detected as indicating a first gesture identification error.

The processor 120 of the electronic device 101 may, based on the detection of the first gesture identification error in the hovering state, control the display 160 to display guide content prompting a user to adjust the distance between the stylus pen 300 and the display 160 (operation 703). In other words, the processor 120 may control the display 160 to display the first guide content for instructing a user to move the stylus pen 300 to a location outside the predetermined distance from the display 160.

The processor 120 of the electronic device 101 may detect an error in a second gesture identification error generated by a tilt of the stylus pen 300 while disposed in an air state (operation 704). The processor 120 may acquire tilt information of the stylus pen 300 with respect to the ground (e.g., a plane of the Earth) while a gesture input is received in an air state. The tilt information may be transmitted from the sensor 367 disposed in the stylus pen 300. The processor 120 may, based on detection of a tilt value that is greater than or equal to a first angle (e.g., 60 degrees) and less than or equal to a second angle (e.g., 90 degrees), detect that a second gesture identification error has occurred. The second gesture identification error may indicate a case in which the stylus pen 300 is substantially perpendicular with respect to the ground. When the stylus pen 300 is perpendicular with respect to the ground, an error rate may increase with respect to coordinates indicating the position and motion of the stylus pen 300, which may cause an error in a gesture identification operation.

The processor 120 of the electronic device 101 may, based on the detection of the second gesture identification error, control the display 160 to display guide content prompting a user to adjust the tilt of the stylus pen 300 (operation 705). In other words, the processor 120 may control the display 160 to display second guide content instructing a user to adjust the tilt of the stylus pen 300 to be less than the first angle.

Meanwhile, in some embodiments, the processor 120 of the electronic device 101 may, based on identifying a gesture input as a predetermined exception gesture, omit display of the guide content, even upon detecting the tilt greater than or equal to the first angle (e.g., 60 degrees) and less than or equal to the second angle (e.g., 90 degrees), and instead execute a function corresponding to the exception gesture. The exception gesture may indicate a gesture in which the stylus pen 300 is highly likely to be disposed perpendicularly to the display, when the gesture is input. For example, the exception gesture may be an upward gesture, a downward gesture, or a zigzag gesture. That is, in the gesture identification processing of the processor 120, a state in which the stylus pen 300 is temporarily disposed perpendicularly with respect to the ground may be ignored with respect to the exception gesture.

The processor 120 of the electronic device 101 may detect a third gesture identification error generated by detection of an abnormal gesture in an air state (operation 706). The processor 120 may determine a third gesture identification error has occurred based on detecting that a gesture input received in an air state is different from known predetermined reference gestures. For example, the reference gesture may include a leftward gesture, a rightward gesture, an upward gesture, a downward gesture, a clockwise circle gesture, a counterclockwise circle gesture, an upward return gesture, a downward return gesture, a leftward return gesture, a rightward return gesture, and/or a zigzag gesture. However, when a gesture operation input by the user in an air state does not correspond to any stored reference gesture, it may be determined that an abnormal gesture has been input. The processor 120 of the electronic device 101 may, based on the detection of the third gesture identification error, control the display 160 to display third guide content for prompting the user to input a known reference gesture (operation 707).

When no gesture identification error is detected, the processor 120 of the electronic device 101 may execute a function corresponding to the gesture input (operation 708). For example, when the camera application is running, a transition between a front camera and a rear camera may be performed in response to an upward gesture or a downward gesture. A transition to a previous mode may be performed in response to a leftward gesture, and a transition to a next mode may be performed in response to a rightward gesture. In addition, camera zoom-in (e.g., an enlargement) may be performed in response to a clockwise circle gesture, and camera zoom-out (e.g., a reduction) may be performed in response to a counterclockwise circle gesture. The function corresponding to the gesture input may be different for each application, and may be changed according to a user setting.

The processor 120 of the electronic device 101 may count the number of occurrences of each of the first gesture identification error, the second gesture identification error, and/or the third gesture identification error. The processor 120 may control the display 160 to display the first guide content, the second guide content, or the third guide content based on the number of occurrences of each gesture identification error. The processor 120 may initialize (e.g., reset to zero) the counted number of occurrences of the gesture identification error associated with the displayed guide content after the guide content is displayed on the display 160.

Figure 8:
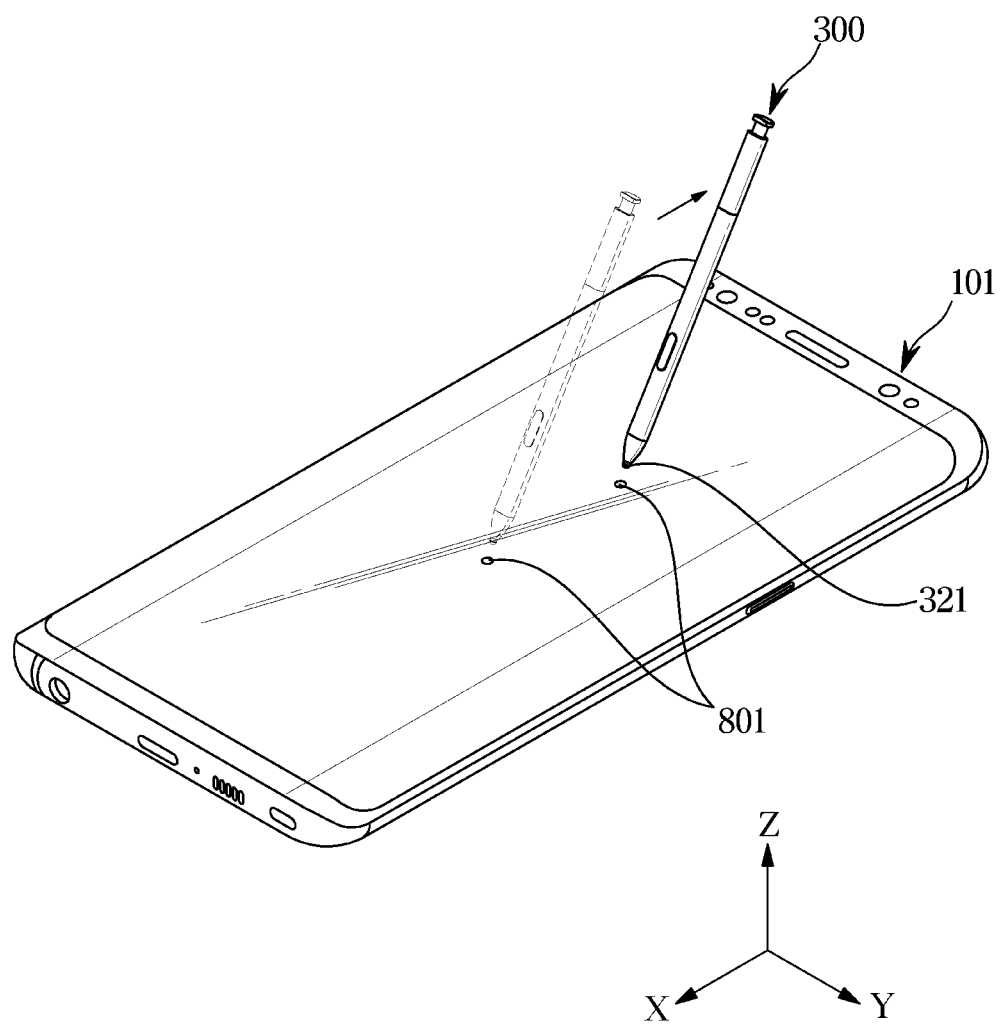
FIG. 8 illustrates a hovering state of an electronic device and a stylus pen according to an embodiment.
Figure 9:
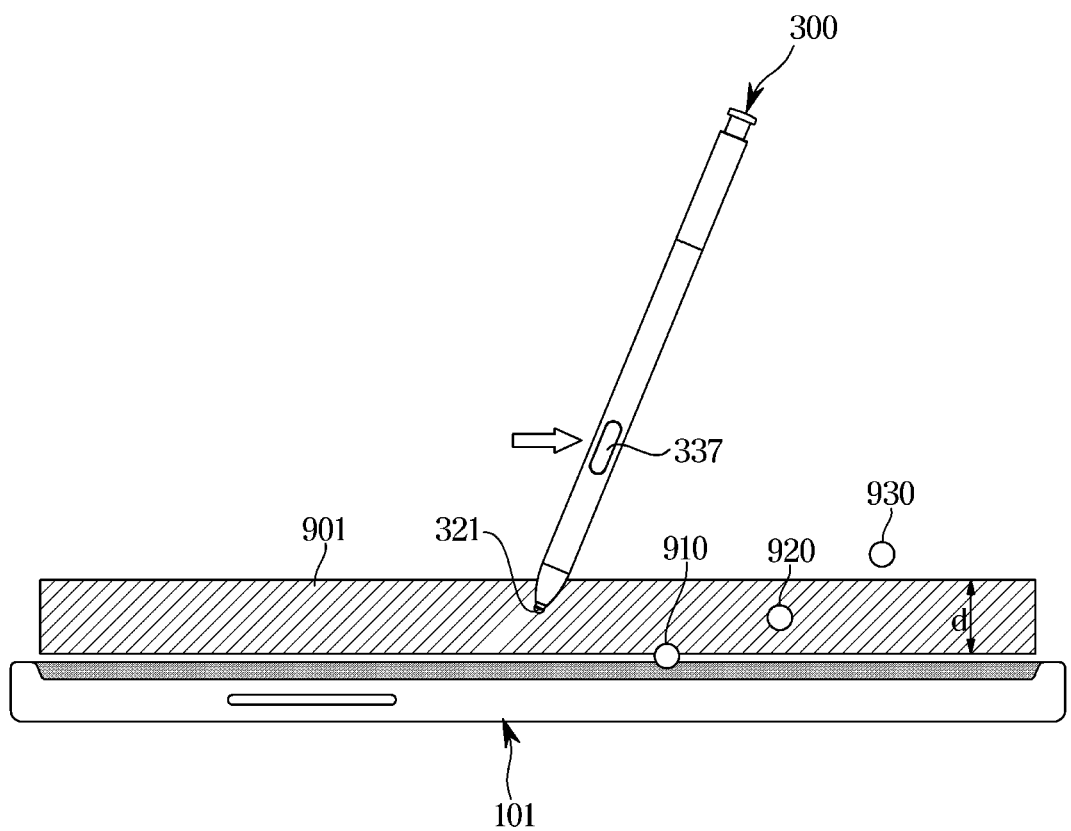
FIG. 9 illustrates an operation of a stylus pen processed as valid in a hovering state according to an embodiment.
Figure 10:
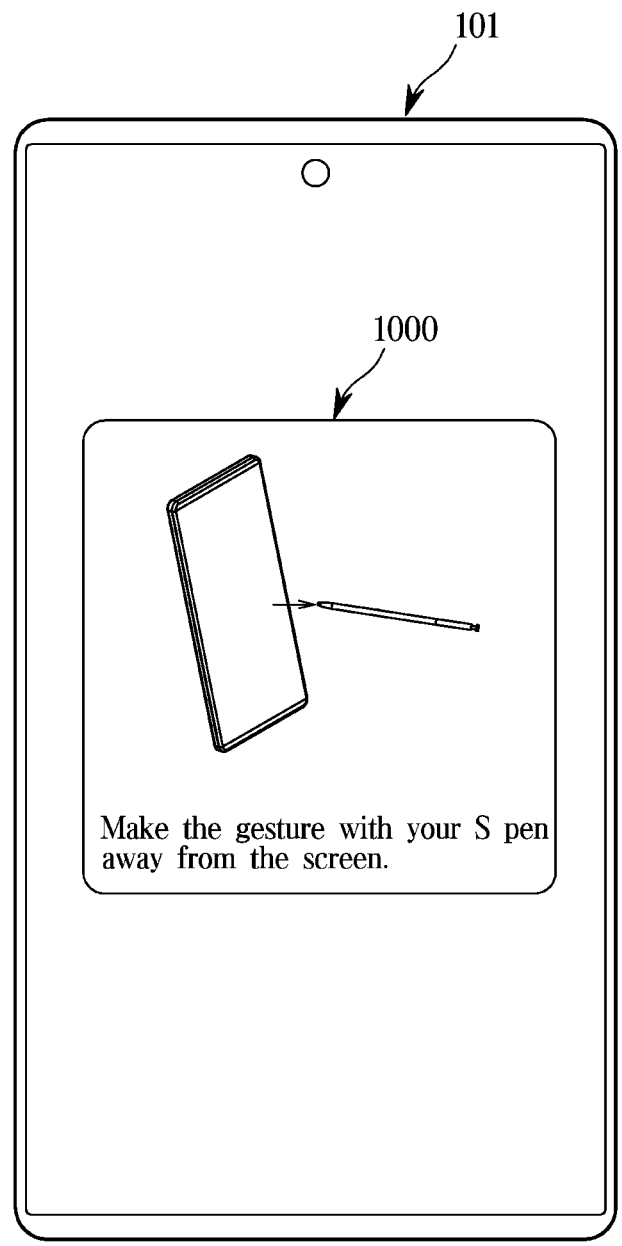
FIG. 10 illustrates an example of first guide content displayed in response to a first gesture identification error in a hovering state.

FIG. 8 illustrates a hovering state of an electronic device and a stylus pen according to an embodiment. FIG. 9 illustrates an operation of a stylus pen processed as valid in a hovering state according to an embodiment. FIG. 10 illustrates an example of first guide content displayed in response to a first gesture identification error in a hovering state.

Referring to FIGS. 8 and 9, a hovering state 920 may refer to a state in which the stylus pen 300 is spaced apart from the display 160 so as to be located within a predetermined distance "d" from the display 160. When the stylus pen 300 enters a hovering area 901, a mark 801 may be displayed on the display 160 representing the position of the pen tip 321. The mark 801 may move in tandem with the movement of the stylus pen 300 within the hovering area 901, which is illustrated as an imaginary region above the surface of the display, as seen in FIG. 9.

An air state 930 may refer to a state in which the stylus pen 300 is spaced apart from the display 160 so as to be located outside the predetermined distance "d" from the display 160. That is, the air state 930 may refer to a state in which the stylus pen 300 is spaced apart from the display 160 so as to be located outside the hovering area 901. A contact state 910 may refer to a state in which the tip 321 of the stylus pen 300 is in direct contact with the display 160. The processor 120 of the electronic device 101 may acquire position data of the stylus pen 300, and calculate the distance between the stylus pen 300 and the display 160 based on the position of the stylus pen 300.

When a button input using the side button 337 of the stylus pen 300 is received in a state in which the stylus pen 300 is spaced apart from the display 160 while located within the hovering area 901 (in the hovering state 920), the processor 120 of the electronic device 101 may execute a function corresponding to the button input. For example, when the user clicks the side button 337 of the stylus pen 300 once, a menu including selectable objects (e.g., icons selectable to execute corresponding applications) may be displayed on the display 160.

In some cases, the stylus pen 300 may enter the contact state 910 by the pen tip 321 contacting with the display 160, or enter into the hovering state 901 by the stylus pen 300 moving outside the hovering area 901. However, the transition into the contact state 910 or the hovering state 901 may occur between the depression of the side button 337 of the stylus pen 300 and release of the side button 337. Consequently, the state in which the side button 337 was depressed may be indeterminate due to the stylus pen 300 transitioning between states before the side button 337 activation was completed, the resulting input may be processed as invalid.

Referring to FIG. 10, the processor 120 of the electronic device 101 may determine a gesture input of the stylus pen 300 (e.g., detected in the hovering state 920) suffers a first gesture identification error. When a first gesture identification error is detected in the hovering state 920, first guide content 1000 prompting adjustment of the distance between the stylus pen 300 and the display 160 may be displayed on the display 160. The first guide content 1000 may instruct a user to move the stylus pen 300 to a location outside the predetermined distance "d" from the display 160. For example, the first guide content 1000 may be provided as a floating icon and/or a pop-up message, and may include at least one of text, a static image, or a dynamic image.

Figure 11:
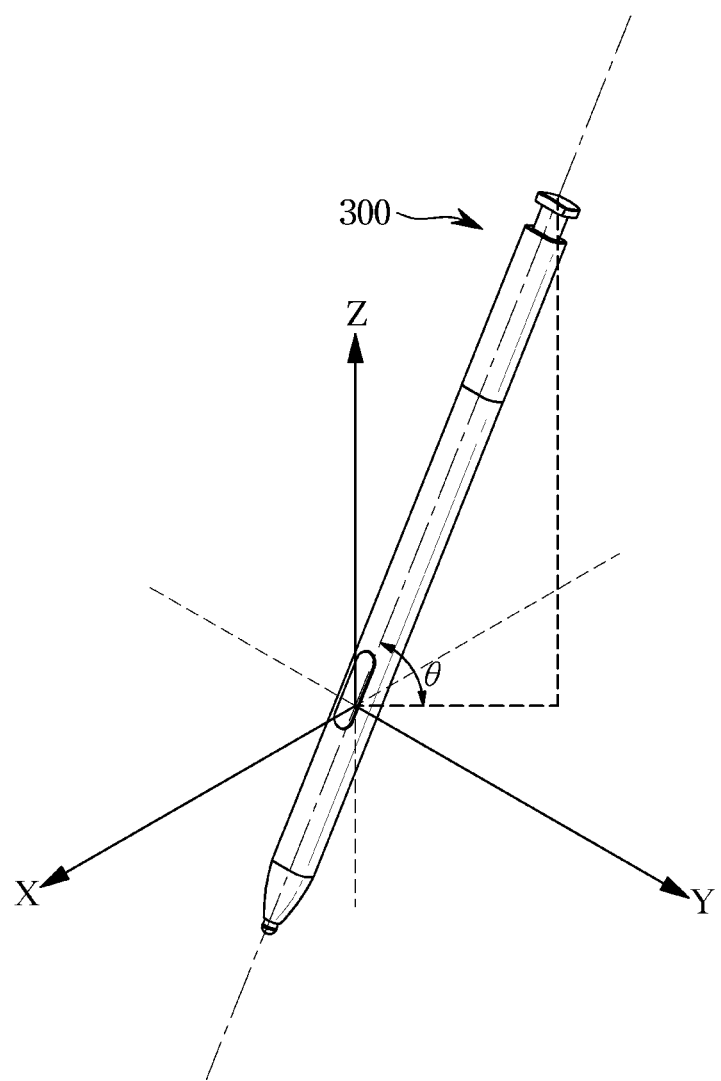
FIG. 11 illustrates an occurrence of a second gesture identification error according to the tilt of a stylus pen in an air state.
Figure 12:
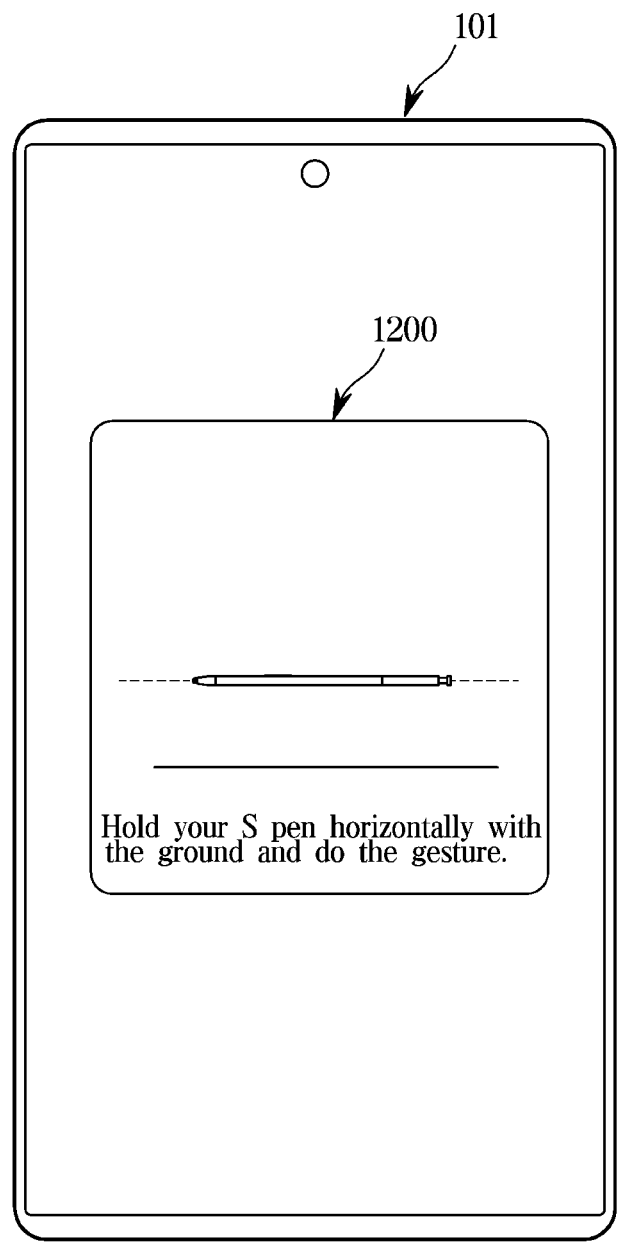
FIG. 12 illustrates an example of second guide content displayed in response to a second gesture identification error in an air state.

FIG. 11 illustrates a second gesture identification error caused by improper tilt of the stylus pen in the air state. FIG. 12 illustrates an example of second guide content displayed in response to a second gesture identification error in an air state.

Referring to FIG. 11, the processor 120 of the electronic device 101 may acquire tilt information of the stylus pen 300 with respect to the ground (e.g., a plane of the Earth) while a gesture input is received in an air state. When the tilt θ of the stylus pen 300 with respect to the ground (e.g., an XY plane) is greater than or equal to the first angle (e.g., 60 degrees) and less than or equal to the second angle (e.g., 90 degrees), the second gesture identification error may be detected. The second gesture identification error indicates a state in which the stylus pen 300 is substantially perpendicular with respect to the ground.

The processor 120 of the electronic device 101 may acquire the position and motion detected by the sensor 367 of the stylus pen 300 as coordinate data, and when the tilt θ of the stylus pen 300 approximates the vertical, the error rate of the coordinate data may increase. The phenomenon, i.e., a gimbal lock phenomenon, may be caused by operation a gyro sensor included in the sensor 367. The gyro sensor may include a component referred to as a gimbal, which may represent rotation in three degrees of freedom, such as roll, pitch, and yaw. With the gimbal lock phenomenon, two axes become parallel and thus the rotation system is limited to two dimensions. When the stylus pen 300 is vertically perpendicular relative to the ground, the Z-axis degree of freedom of the gyro sensor may be lost, and the processor 120 of the electronic device 101 may lose coordinate data of the stylus pen 300. Accordingly, a gesture input in a state in which the stylus pen 300 is perpendicular with respect to the ground may cause failure of gesture identification by the processor 120.

However, a case in which the stylus pen 300 is temporarily perpendicular with respect to the ground may not correspond to the second gesture identification error. In other words, when a part of a gesture path (e.g., 20% or less of a gesture path) is drawn with the stylus pen 300 perpendicular in an upright state, the processor 120 of the electronic device 101 may nevertheless be able to identify the input gesture without error.

In addition, the processor 120 of the electronic device 101 may, even upon detecting a state in which the stylus pen 300 is perpendicular with respect to the ground while the gesture input is being received in an air state, successfully process the gesture identification based on identifying a gesture input as an exception gesture. In other words, even when a state in which the tilt of the stylus pen 300 is greater than or equal to the first angle and less than or equal to the second angle is detected, the processor 120 may succeed in identifying the exception gesture. However, when a larger portion of the gesture input (for example, 70% or more of the gesture input) is performed in a state in which the stylus pen 300 is perpendicular with respect to the ground, the processor 120 may determine that the exception gesture is not identifiable, and determine that a second gesture identification error has occurred.

Referring to FIG. 12, the processor 120 of the electronic device 101 may, based on the detection of the second gesture identification error in the air state, control the display 160 to display second guide content 1200 prompting the user to adjust the tilt of the stylus pen 300. The processor 120 may control the display 160 to display the second guide content 1200 for instruction a user to adjust the tilt of the stylus pen 300 to be less than the first angle. The second guide content 1200 illustrated in FIG. 12 may prompt a gesture to be input while maintaining the stylus pen 300 horizontally with respect to the ground. The second guide content 1200 may be provided as a floating icon and/or a pop-up message, and may include at least one of text, a static image, or a dynamic image.

Figure 13:
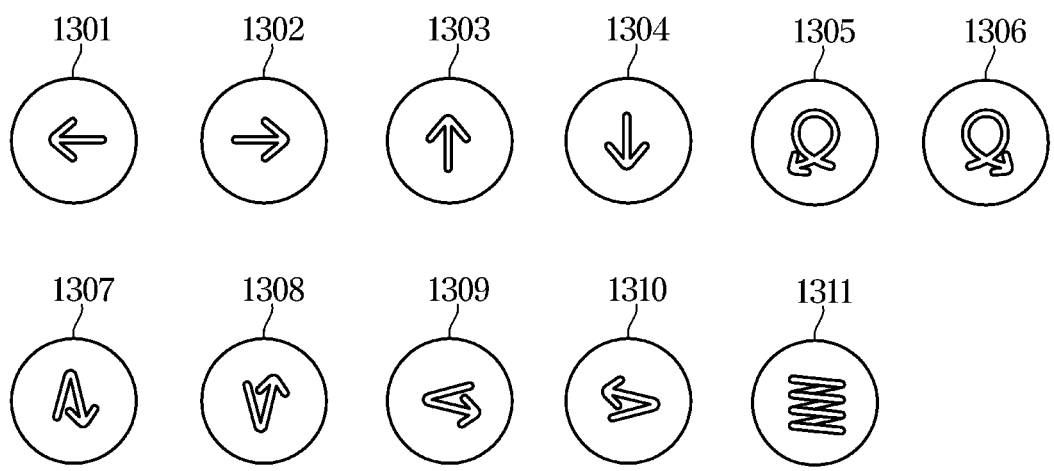
FIG. 13 illustrates an example of reference gestures identifiable in an air state.

FIG. 13 illustrates an example of reference gestures identifiable in an air state. Referring to FIG. 13, a reference gesture identifiable by the processor 120 of the electronic device 101 may be provided. For example, the reference gestures may include a leftward gesture 1301, a rightward gesture 1302, an upward gesture 1303, a downward gesture 1304, a clockwise circle gesture 1305, a counterclockwise circle gesture 1306, an upward return gesture 1307, a downward return gesture 1308, a leftward return gesture 1309, a rightward return gesture 1310, and/or a zigzag gesture 1311. Functions of the electronic device 101 executed in response to each gesture may be set in advance or may be changed according to a user setting. In addition, a function executed in response to each gesture may be different for each application.

For example, in a state in which the camera application is running, a transition to a previous mode may be executed in response to the leftward gesture 1301, and a transition to a next mode may be executed in response to the rightward gesture 1302.

In addition, a transition between the front camera and the rear camera may be performed in response to the upward gesture 1303 or the downward gesture 1304. In addition, a camera zoom-in (enlargement) may be performed in response to the clockwise circle gesture 1305, and a camera zoom-out (reduction) may be performed in response to the counterclockwise circle gesture 1306.

The upward return gesture 1307 may be a gesture of returning after moving the stylus pen 300 upward, and the downward return gesture 1308 may be a gesture of returning after moving the stylus pen 300 downward, the leftward return gesture 1309 may be a gesture of returning after moving the stylus pen 300 leftward, and the rightward return gesture 1310 may be a gesture of returning after moving the stylus pen 300 rightward. In addition, the zigzag gesture 1311 may be a gesture of repeatedly moving the stylus pen 300 in the leftward and rightward directions. The functions of the electronic device 101 corresponding to each of the upward return gesture 1307, the downward return gesture 1308, the leftward return gesture 1309, the rightward return gesture 1310, and the zigzag gesture 1311 may be executed.

Figure 14:
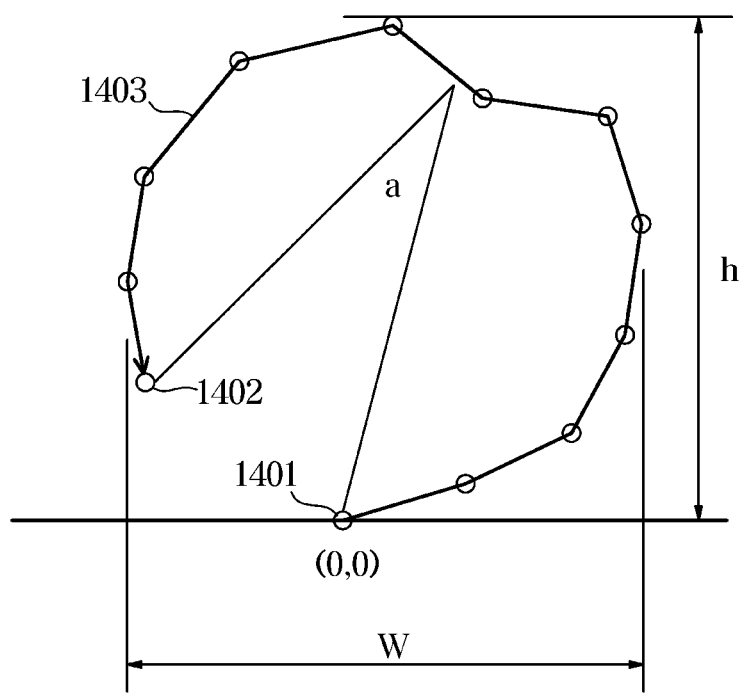
FIG. 14 illustrates an example of a method of identifying a gesture input of a stylus pen.

FIG. 14 illustrates an example of a method of identifying a gesture input of a stylus pen.

Referring to FIG. 14, the processor 120 of the electronic device 101 may acquire, from a gesture input of the stylus pen 300, gesture attributes including a start point 1401, an end point 1402, a gesture path 1403, a width w of the gesture, a height h of the gesture, a moving direction and/or shape. In addition, the gesture attributes may include an angle "a" formed by the start point 1401, the end point 1402, and a center point of the gesture path 1403. The processor 120 may determine a reference gesture that matches the acquired gesture attributes. For example, the processor 120 may identify the input gesture as a counterclockwise circular gesture, when the gesture path rotates in the leftwards direction, when the angle a is an acute angle, and when the ratio of the width w to the height h satisfies a predetermined reference value.

In addition, the processor 120 of the electronic device 101 may calculate a gesture size and/or a gesture input speed by analyzing the gesture attributes. The processor 120 may calculate the gesture size based on the width w and height h of the gesture, and may calculate the gesture input speed based on the distance between points on the coordinate system. When the distance between the points is sufficiently short (e.g., as per a threshold thereof), it may be determined that the gesture input speed is low.

Figure 15:
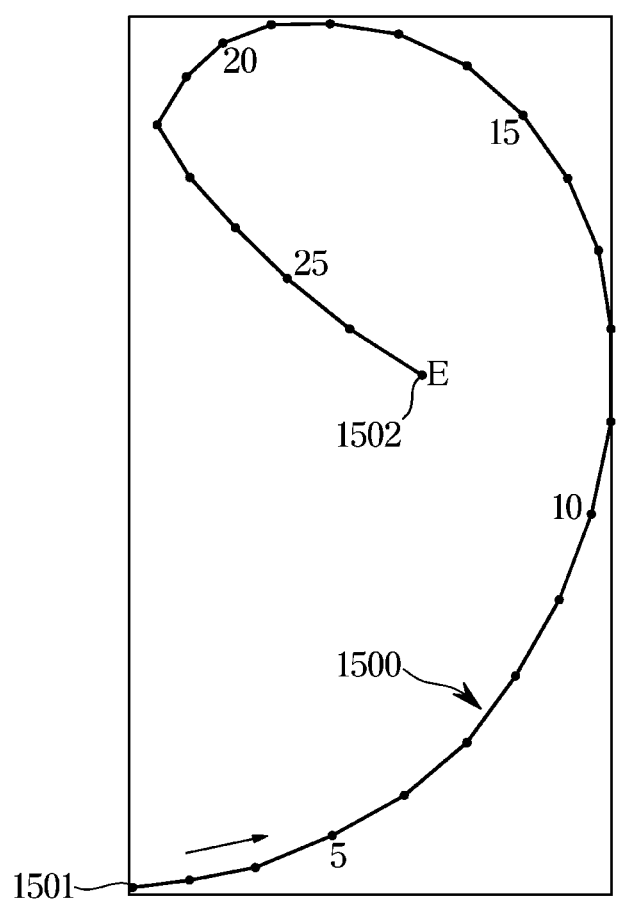
FIG. 15 illustrates an occurrence of a third gesture identification error according to identification of an abnormal gesture.
Figure 16:
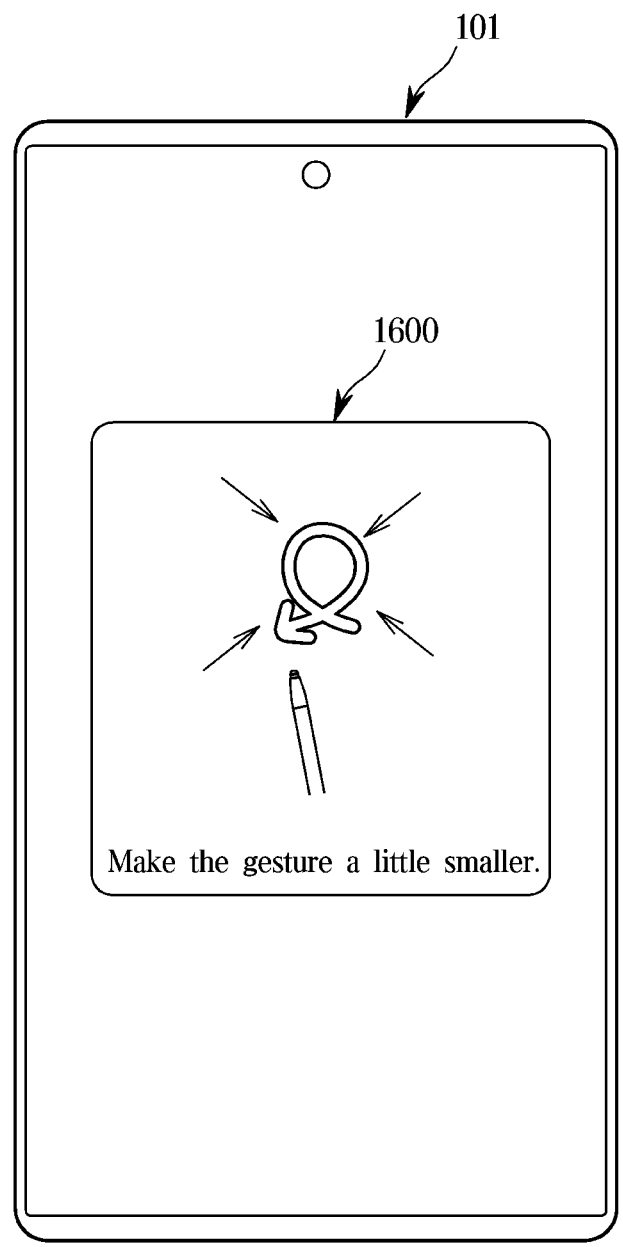
FIG. 16 illustrates an example of third guide content displayed in response to a third gesture identification error.

FIG. 15 illustrates an occurrence of a third gesture identification error according to identification of an abnormal gesture. FIG. 16 illustrates an example of third guide content displayed in response to a third gesture identification error.

Referring to FIG. 15, the processor 120 of the electronic device 101 may acquire gesture attributes of a gesture input received in an air state, and analyze the gesture attributes to determine whether an abnormal gesture is detected. When the gesture action received in the air state does not correspond to any known reference gesture, the processor 120 may determine that an abnormal gesture has been input. The processor 120 may determine a third gesture identification error according to the identification of the abnormal gesture. For example, as shown in FIG. 15, when a gesture path 1500 formed to draw a semicircle leftward while extending from a start point 1501 to an end point 1502 of a gesture input is bent rightward to reverse the moving direction of the gesture path 1500, the processor 120 of the electronic device 101 may identify the gesture input of the stylus pen 300 as an abnormal gesture. Even when the user intends to draw a counterclockwise circular gesture among the reference gestures, it may be considered as a third gesture identification error because the input gesture does not correspond to the reference gesture in practice.

In addition, when the gesture input of the user is excessively large, the gesture path may be cut off at a location departing from the gesture recognition range, and when the gesture input of the user is excessively small, the processor 120 may not be able to acquire the gesture attributes. That is, even when the size of the input gesture is larger than a predetermined reference size by a threshold value or when the size of the input gesture is smaller than a predetermined reference size by a threshold value, the processor 120 of the electronic device 101 may identify that a third gesture identification error has occurred.

Referring to FIG. 16, the processor 120 of the electronic device 101 may, based on detection of a third gesture identification error in an air state, control the display 160 to display third guide content 1600 prompting input of a reference gesture. As illustrated in FIG. 16, the processor 120 may control the display 160 to display the third guide content 1600 instructing a user to input a gesture smaller than the previously input gesture based on the size of the input gesture. In addition, the processor 120 may control the display 160 to display the third guide content 1600 for guiding to input a gesture larger than the previously input gesture based on the size of the input gesture.

As described above, the disclosed electronic device and method of operating the electronic device may detect an error related to a gesture input by a stylus pen and provide guide content regarding the error. A user may recognize an error in gesture input through the guide content, and may be guided to take action to resolve the error.

The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, various steps can be handled in a different order or simultaneously, and steps may be omitted or added.

What is claimed is:

1. An electronic device, comprising:
    a display;
    a communication circuit configured to perform wireless connection with a stylus pen;
    a processor operably coupled to the display and the communication circuit; and
    a memory storing programming instructions,
    wherein the programming instructions are executable by the processor to cause the electronic device to:
        identify whether the stylus pen is disposed in a hovering state, in which the stylus pen is spaced apart from the display while located within a predetermined distance from the display, or in an air state in which the stylus pen is spaced apart from the display and disposed beyond the predetermined distance from the display;
        receive, via the communication circuit, a gesture input from the stylus pen;
        detect a gesture identification error generated via a tilt of the stylus pen in response to receiving the gesture input in the air state; and
        control the display to display a visual guide corresponding to the gesture identification error.

2. The electronic device of claim 1, wherein the gesture identification error generated via the tilt of the stylus pen is a first gesture identification error, and the visual guide is a first visual guide, the processor is further configured to:
    detect a second gesture identification error including an abnormal gesture in the air state,
    control the display to display the first visual guide corresponding to the first gesture identification error or a second visual guide corresponding to the second gesture identification error.

3. The electronic device of claim 1, wherein the processor is configured to:
    acquire a tilt value for the stylus pen with respect to a ground while the gesture input is received in the air state,
    wherein the gesture identification error is detected based on detecting that the tile value is greater than or equal to a first angle and less than or equal to a second angle.

4. The electronic device of claim 3, wherein the visual guide is configured to prompt a user to adjust the tilt of the stylus pen to be less that the first angle.

5. The electronic device of claim 3, wherein the processor is configured to:
    based on detecting that the gesture input includes a predetermined exception gesture, omit display of the visual guide, and execute a function corresponding to the exception gesture.

6. The electronic device of claim 2, wherein the abnormal gesture in the air state is identified by differences from a predetermined reference gesture in the air state.

7. The electronic device of claim 6, wherein based on the second gesture identification error is detected, the second visual guide is configured to prompt a user to input the predetermined reference gesture.

8. The electronic device of claim 1, wherein the processor is configured to:
    count a number of occurrences of the gesture identification error,
    wherein the visual guide is displayed when the number of occurrences of the gesture identification is counted consecutively and reaches a predetermined first number of times, or when the number of occurrences of the gesture identification error is counted nonconsecutively and cumulatively reaches a predetermined second number of times.

9. The electronic device of claim 8, wherein the processor is configured to:
    reset the counted number of occurrences after the visual guide is displayed.

10. A method of operating an electronic device, the method comprising:
    establishing a communicative connection with a stylus pen via a communication circuit;
    identifying, via at least one processor, whether the stylus pen is disposed in a hovering state, in which the stylus pen is spaced apart from a display while located within a predetermined distance from the display, or in an air state in which the stylus pen is spaced apart from the display and disposed beyond the predetermined distance from the display;
    receiving a gesture input from the stylus pen;
    detecting a gesture identification error generated via a tilt of the stylus pen in response to receiving the gesture input in the air state; and
    displaying, via the display, a visual guide corresponding to the gesture identification error.

11. The method of claim 10, wherein the gesture identification error generated via the tilt of the stylus pen is a first gesture identification error, and the visual guide is a first visual guide, the method further comprising:
    detecting a second gesture identification error including an abnormal gesture in the air state; and
    displaying, via the display, the first visual guide corresponding to the first gesture identification error or a second visual guide corresponding to the second gesture identification error.

12. The method of claim 10, further comprising:
    acquiring a tilt value for the stylus pen with respect to a ground while the gesture input is received in the air state,
    wherein the gesture identification error is detected based on detecting that the tile value is greater than or equal to a first angle and less than or equal to a second angle.

13. The method of claim 12, wherein based on the gesture identification error is detected, the visual guide is configured to prompt a user to adjust the tilt of the stylus pen to be less that the first angle.

14. The method of claim 12, further comprising:
based on detecting that the gesture input includes a predetermined exception gesture, omit display of the visual guide, and execute a function corresponding to the exception gesture.

15. The method of claim 11, wherein the abnormal gesture in the air state is identified by differences from a predetermined reference gesture in the air state.

16. The method of claim 15, wherein based on the second gesture identification error is detected, the second visual guide is configured to prompt a user to input the predetermined reference gesture.

17. The method of claim 10, further comprising:
counting a number of occurrences of the gesture identification error,
wherein the visual guide is displayed when the number of occurrences of the gesture identification is counted consecutively and reaches a predetermined first number of times, or when the number of occurrences of the gesture identification error is counted nonconsecutively and cumulatively reaches a predetermined second number of times.

18. The method of claim 17, further comprising:
resetting the counted number of occurrences after the visual guide is displayed.

* * * * *